United States Patent
Saito et al.

(10) Patent No.: US 10,028,093 B2
(45) Date of Patent: Jul. 17, 2018

(54) INFORMATION PROCESSING APPARATUS AND INFORMATION PROCESSING METHOD

(71) Applicant: SONY CORPORATION, Tokyo (JP)

(72) Inventors: Erika Saito, Tokyo (JP); Kazuyuki Sakoda, Chiba (JP); Takatoshi Nakamura, Tokyo (JP); Akihiro Ihori, Kanagawa (JP); Yueting Hu, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/323,896

(22) PCT Filed: Jun. 8, 2015

(86) PCT No.: PCT/JP2015/066513
§ 371 (c)(1),
(2) Date: Jan. 4, 2017

(87) PCT Pub. No.: WO2016/013316
PCT Pub. Date: Jan. 28, 2016

(65) Prior Publication Data
US 2017/0150309 A1     May 25, 2017

(30) Foreign Application Priority Data

Jul. 25, 2014    (JP) ................... 2014-151292

(51) Int. Cl.
*H04W 4/02* (2018.01)
*H04W 4/021* (2018.01)
(Continued)

(52) U.S. Cl.
CPC ............. *H04W 4/021* (2013.01); *H04W 4/12* (2013.01); *H04W 8/22* (2013.01); *H04W 84/18* (2013.01); *H04W 88/04* (2013.01)

(58) Field of Classification Search
CPC ......... H04W 4/021; H04W 4/12; H04W 8/22; H04W 84/18; H04W 88/04
See application file for complete search history.

(56) References Cited

U.S. PATENT DOCUMENTS

2009/0063419 A1*   3/2009   Nurminen ......... G06F 17/30817
2009/0148124 A1*   6/2009   Athsani ................. G06Q 30/02
                                                                               386/241
(Continued)

FOREIGN PATENT DOCUMENTS

JP      2003-143048 A    5/2003
JP      2006-005547 A    1/2006
(Continued)

*Primary Examiner* — Thai Vu
(74) *Attorney, Agent, or Firm* — Chip Law Group

(57) ABSTRACT

To cause a specific device to stay in a specific location. An information processing apparatus includes a control unit. The control unit in the information processing apparatus performs control that transmits a stay request to request a stay in a specific location to a first information processing apparatus included in a plurality of information processing apparatuses in a network in which the plurality of information processing apparatuses perform one-to-one wireless communication to be connected to each other. In addition, the control unit in the information processing apparatus performs control that gives an incentive to the first information processing apparatus under a condition that the first information processing apparatus stays in the specific location.

16 Claims, 33 Drawing Sheets

(51) Int. Cl.
*H04W 8/22* (2009.01)
*H04W 4/12* (2009.01)
*H04W 84/18* (2009.01)
*H04W 88/04* (2009.01)

(56) References Cited

U.S. PATENT DOCUMENTS

| | | | | |
|---|---|---|---|---|
| 2010/0082478 | A1* | 4/2010 | Van Der Veen | G06F 21/10 705/39 |
| 2012/0315927 | A1* | 12/2012 | Du | H04W 4/02 455/456.3 |
| 2012/0317595 | A1* | 12/2012 | Hong | H04N 5/28 725/23 |
| 2014/0011448 | A1* | 1/2014 | Yang | H04B 5/00 455/41.1 |
| 2014/0128022 | A1* | 5/2014 | Anderson | H04L 12/1475 455/406 |

FOREIGN PATENT DOCUMENTS

| | | | |
|---|---|---|---|
| JP | 2006005547 A * | 1/2006 | |
| JP | 3768992 B2 | 4/2006 | |
| JP | 2007-104464 A | 4/2007 | |
| JP | 2009-239385 A | 10/2009 | |
| WO | 2006/077977 A1 | 7/2006 | |

* cited by examiner

OPERATION EXAMPLE OF
INFORMATION PROCESSING APPARATUS WHICH RELAYS DATA

OPERATION EXAMPLE OF
INFORMATION PROCESSING APPARATUS WHICH REQUESTS DATA TRANSMISSION

BEACON FRAME EXAMPLE

MESH PEERING OPEN FRAME EXAMPLE   MESH PEERING CONFIRM FRAME EXAMPLE

MANAGEMENT SETTING REQUEST FRAME EXAMPLE

| Frame Control | Duration/ID | RA | TA | Mesh DA | Seq Control | Mesh SA | QOS | HT | Mesh Control | SETTING DISTANCE 541 | SETTING TIME 542 | INCENTIVE 543 | ... | FCS |

FIG. 17a

MANAGEMENT SETTING CONFIRMATION FRAME EXAMPLE

| Frame Control | Duration/ID | RA | TA | Mesh DA | Seq Control | Mesh SA | QOS | HT | Mesh Control | SETTING DISTANCE 551 | SETTING TIME 552 | INCENTIVE 553 | SETTING RESULT 554 | ... | FCS |

FIG. 17b

VIOLATION NOTIFICATION FRAME EXAMPLE

| Frame Control | Duration/ID | RA | TA | Mesh DA | Seq Control | Mesh SA | QOS | HT | Mesh Control | SETTING DISTANCE 561 | SETTING TIME 562 | INCENTIVE DISABLE INFO 563 | ... | FCS |

FIG. 17c

PERIPHERAL DEVICE LIST
650

| | TERMINAL IDENTIFICATION INFORMATION | DISTANCE CONVERSION VALUE |
|---|---|---|
| | 651 | 652 |
| 1 | (801) | xxx |
| 2 | (802) | yyy |
| ⋮ | ⋮ | ⋮ |
| N | (806) | zzz |

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2015/066513 filed on Jun. 8, 2015, which claims priority benefit of Japanese Patent Application No. JP 2014-151292 filed in the Japan Patent Office on Jul. 25, 2014. Each of the above-referenced applications is hereby incorporated herein by reference in its entirety.

TECHNICAL FIELD

The present technology relates to an information processing apparatus, more particularly to an information processing apparatus which performs an exchange of information using wireless communication, and an information processing method.

BACKGROUND ART

In the related art, there is a wireless communication technology which performs an exchange of information using wireless communication. For example, a communication system (for example, ad-hoc communication or an ad-hoc network) which is autonomously interconnected to a peripheral information processing apparatus has been proposed (for example, refer to Patent Document 1).

CITATION LIST

Patent Literature

Patent Literature 1: JP 2009-239385A

SUMMARY OF INVENTION

Technical Problem

According to the technology of the related art described above, it is possible to exchange information between two information processing apparatuses using wireless communication even if the information processing apparatuses are not connected to each other by a wire circuit. In addition, in such a network, each of the information processing apparatuses can mutually communicate with peripheral information processing apparatuses without depending on a master station such as a control device.

In addition, each of the information processing apparatuses can be autonomously interconnected to peripheral information processing apparatuses and can transfer (a so-called, multi-hop relay) information exchanged between itself and other information processing apparatuses in a bucket brigade manner. Moreover, a network which performs a multi-hop relay is generally known as a mesh network.

In this manner, it is possible to freely communicate with a peripheral information processing apparatus in an ad-hoc network or a mesh network.

Here, for example, it is assumed that there is a user who desires a specific information processing apparatus, which belongs to a network, to stay in a specific location satisfying a certain condition. For example, it is assumed that it is desired that a relay device for relaying two devices stay in a location (or a location in which a relative distance between the two devices can be maintained). In addition, for example, it is assumed that it is desired that an information processing apparatus carried by a child stay in a location (for example, a playground) in which the child can be safe. In such a case, it is important to cause a specific device to stay in a specific location.

The present technology is made in view of such circumstances, and it is desirable to cause a specific device to stay in a specific location.

Solution to Problem

The present technology has been made in order to solve the above problem. According to a first aspect of the present technology, there is provided an information processing apparatus, an information processing method, and a program causing a computer to execute the method, the information processing apparatus including a control unit configured to transmit a stay request to request a stay in a specific location to a first information processing apparatus included in a plurality of information processing apparatuses in a network in which the plurality of information processing apparatuses perform one-to-one wireless communication to be connected to each other, and configured to perform a control to give an incentive to the first information processing apparatus under a condition that the first information processing apparatus stays in the specific location. In this manner, there is an effect to transmit a stay request which requests a stay in a specific location to a first information processing apparatus, and to give an incentive to the first information processing apparatus under a condition that the first information processing apparatus stays in the specific location.

According to the first aspect, the first information processing apparatus may be a relay device that relays data when the information processing apparatus receives the data transmitted from a second information processing apparatus included in the plurality of information processing apparatuses, and the control unit may give the incentive to the first information processing apparatus under a condition that the first information processing apparatus stays in the specific location until reception of the data is completed. In this manner, there is an effect to give an incentive to the first information processing apparatus under a condition that the first information processing apparatus stays in the specific location until reception of the data is completed.

According to the first aspect, the control unit may decide the incentive based on a relative positional relationship among the information processing apparatus, the first information processing apparatus, and the second information processing apparatus. In this manner, there is an effect to decide the incentive based on a relative positional relationship among the information processing apparatus, the first information processing apparatus, and a second processing apparatus.

According to the first aspect, the control unit may decide the incentive based on the number of information processing apparatuses capable of being involved in the reception of the data among respective information processing apparatuses included in the plurality of information processing apparatuses. In this manner, there is an effect to decide the incentive based on the number of information processing apparatuses which can be involved in the reception of the data among respective information processing apparatuses included in a plurality of information processing apparatuses.

According to the first aspect, the control unit may decide the incentive based on a time for which the first information processing apparatus stays in the specific location. In this manner, there is an effect to decide the incentive based on a time for which the first information processing apparatus stays in the specific location.

According to the first aspect, the control unit may start a specific application in the first information processing apparatus by giving the incentive to the first information processing apparatus. In this manner, there is an effect to start a specific application in the first information processing apparatus by giving the incentive to the first information processing apparatus.

According to the first aspect, when the first information processing apparatus is detected to leave a range of the specific location, the control unit may invalidate the incentive. In this manner, there is an effect to invalidate the incentive when the first information processing apparatus is detected to leave a range of the specific location.

According to the first aspect, when the first information processing apparatus is detected to leave a range of the specific location, the control unit may transmit a warning notification for recommending the first information processing apparatus to return to the specific location to the first information processing apparatus. In this manner, there is an effect to transmit a warning notification for causing the first information processing apparatus to return to the specific location to the first information processing apparatus when the first information processing apparatus is detected to leave the range of the specific location.

According to a second aspect of the present technology, there is provided an information processing apparatus, an information processing method, and a program causing a computer to execute the method, the information processing apparatus including a control unit configured to perform a control to perform processing based on an incentive given from a first information processing apparatus under a condition that the information processing apparatus stays in the specific location, when a stay request that requests staying in a specific location is received from the first information processing apparatus included in a plurality of information processing apparatuses in a network in which the plurality of information processing apparatuses perform one-to-one wireless communication to be connected to each other. In this manner, there is an effect to perform processing based on an incentive given from the first information processing apparatus under a condition that the information processing apparatus stays in a specific location when a stay request which requests that the information processing apparatus stay in the specific location is received from the first information processing apparatus.

According to the second aspect, the control unit may start a specific application based on the incentive. In this manner, there is an effect to start a specific application based on the incentive.

According to the second aspect, when the information processing apparatus is detected to leave a range of the specific location, the control unit may stop or terminate the specific application. In this manner, there is an effect to stop or terminate the specific application when the information processing apparatus is detected to leave a range of the specific location.

According to the second aspect, when the information processing apparatus is detected to leave the range of the specific location, the control unit may invalidate the incentive. In this manner, there is an effect to invalidate the incentive when the information processing apparatus is detected to leave the range of the specific location.

According to the second aspect, when the information processing apparatus is detected to leave the range of the specific location, the control unit may transmit a notification of the detection to the first information processing apparatus. In this manner, there is an effect to transmit an indication to the first information processing apparatus when the information processing apparatus is detected to leave the range of the specific location.

Advantageous Effects of Invention

According to the present technology, an excellent effect in which it is possible to cause a specific device to stay in a specific location is obtained. The effects described herein are not necessarily limited, but may be any effect described in this disclosure.

BRIEF DESCRIPTION OF DRAWINGS

FIGS. 17a, 17b and 17c are a diagram which shows a configuration example of a frame exchanged between respective information processing apparatuses included in the communication system 30 according to the second embodiment of the present technology.

DESCRIPTION OF EMBODIMENTS

Hereinafter, embodiments for performing the present technology (hereinafter, referred to as embodiments) will be described. Description will be performed in a following order.
1. First embodiment (Example of causing relay station for performing communication between information processing apparatuses to stay at specific location during communication by giving incentive thereto)
2. Second embodiment (Example of causing user who owns information processing apparatus to stay in specific location)
3. Application examples 1. First Embodiment

Figure 1:
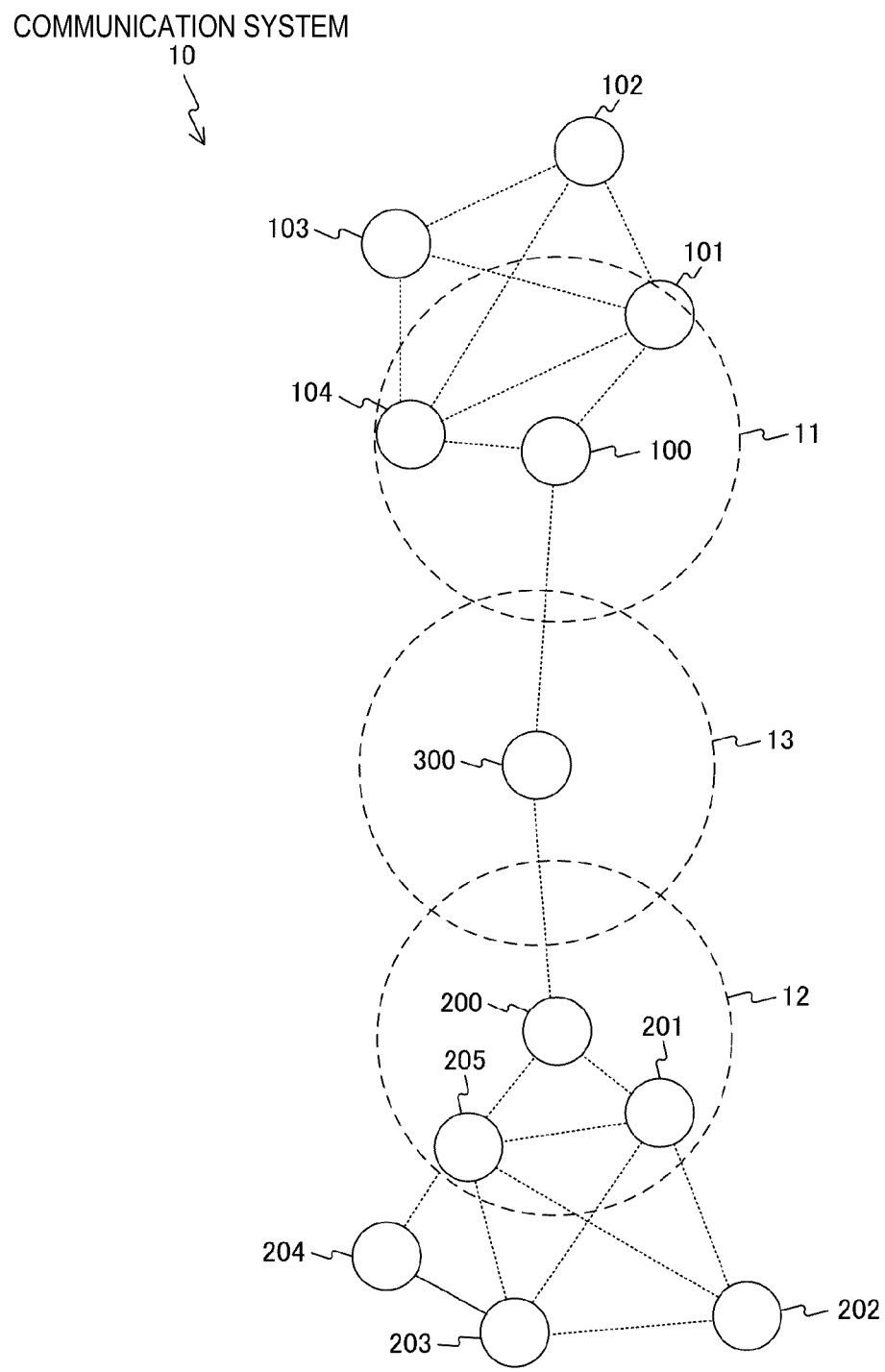
FIG. 1 is a diagram which shows a system configuration example of a communication system 10 according to a first embodiment of the present technology.

[Configuration Example of Communication System]
FIG. 1 is a diagram which shows a system configuration example of a communication system 10 according to a first embodiment of the present technology.

The communication system 10 includes information processing apparatuses 100 to 104, 200 to 205, and 300.

The information processing apparatuses 100 to 104, 200 to 205, and 300 are portable information processing apparatuses with wireless communication functions. Here, a portable information processing apparatus is an information processing apparatus such as a smart phone, a mobile phone, or a tablet terminal. Moreover, the information processing apparatuses 100 to 104, 200 to 205, and 300 may be, for example, fixed-type information processing apparatuses with wireless communication functions. A fixed-type information processing apparatus is an information processing apparatus such as a printer, a personal computer, or an object.

In addition, the information processing apparatuses 100 to 104, 200 to 205, and 300 can perform wireless communication in a wireless local area network (LAN) communication system. Moreover, the information processing apparatuses 100 to 104, 200 to 205, and 300 may perform wireless communication in other communication systems. For example, wireless communication may be performed in a 3$^{rd}$ generation partnership project (3GPP) communication system.

Moreover, in FIG. 1, communication paths of wireless communication performed among respective devices are indicated by straight dotted lines. Wireless communication performed among respective devices is realized, for example, by a communication method which autonomously interconnects respective devices to a peripheral information processing apparatus. The peripheral information processing apparatus is, for example, a neighboring information processing apparatus or an adjacent information processing apparatus.

Here, as the communication method which autonomously interconnects respective devices to a peripheral information processing apparatus, ad-hoc communication, an ad-hoc network, and the like are known. In such a network, each information processing apparatus can communicate with the peripheral information processing apparatus without depending on a mask station (for example, a control device). Therefore, in the first embodiment of the present technology, description will be provided with reference to an example of an ad-hoc network or a mesh network as the communication method which autonomously interconnects respective devices to a peripheral information processing apparatus.

In the ad-hoc network, if a new information processing apparatus is added nearby, this new information processing apparatus can also freely participates in the network. In this manner, it is possible to increase a coverage of the network according to an increase in the number of the information processing apparatuses (peripheral information processing apparatuses). In other words, it is possible to increase the coverage of the network according to a sequential addition of information processing apparatuses.

For example, the information processing apparatuses 100 to 104 are assumed to already form a mesh group. In addition, for example, the information processing apparatuses 200 to 205 are assumed to already form a mesh group.

Here, each information processing apparatus can be autonomously interconnected to a peripheral information processing apparatus and can transfer information exchanged between itself and other information processing apparatuses in a bucket brigade manner.

For example, it is assumed that there is an information processing apparatus (for example, the information processing apparatus 200) which cannot directly communicate with the information processing apparatus 100 for reasons such as its radio waves not-reaching the information processing apparatus 100. Even if direct communication cannot be performed in this manner, the information processing apparatus 300 which can directly communicate with the information processing apparatus 100 can transfer data of the information processing apparatus 100 to the information processing apparatus 200. Therefore, the information processing apparatus 100 and the information processing apparatus 200, which cannot directly communicate with the information processing apparatus 100, can exchange information with each other via the information processing apparatus 300 by transferring data in this manner.

A method of delivering information to distant information processing apparatuses by performing mutual data transfer (a so-called, bucket relay) in this manner is referred to as a multi-hop relay. In addition, a network performing the multi-hop relay is generally known as a mesh network.

In this manner, the information processing apparatuses 100 and 200 can communicate with each other through the information processing apparatus 300 which is a relay station. However, if the information processing apparatus 300 moves to a location at which communication with at least one of the information processing apparatuses 100 and 200 cannot be performed, the information processing apparatuses 100 and 200 cannot communicate with each other.

For example, it is assumed that a user of the information processing apparatus 200 desires to receive data from the information processing apparatus 100. In this case, the user of the information processing apparatus 200 needs to stay near the information processing apparatus 300, which is a relay station in a range in which communication with each of the information processing apparatuses 100 and 200 is possible, until reception of the data is completed.

Therefore, the first embodiment of the present technology shows an example in which an incentive is given to a relay station (that is, a user of a relay station) when it is necessary to have the relay station stay at a position. Accordingly, the user can be asked to stay near a relay station, which is in a range in which data communication is possible, until data communication that the user desired ends.

Here, an incentive refers to a motivation or an inducing material which causes a certain action. For example, an incentive has constraints applied to usage thereof, such as discount tickets, service tickets, points, and cash vouchers, but can be realized by the above replacing an equivalent value of money. In addition, for example, the incentive can be realized by items exchangeable for things, items unilaterally given by clearing conditions such as reward, and items showing a height of values by showing a degree of contribution. For example, giving an incentive can be assumed to be giving information for realizing the incentive (for example, points for realizing the incentive).

[Configuration Example of Information Processing Apparatus]

Figure 2:
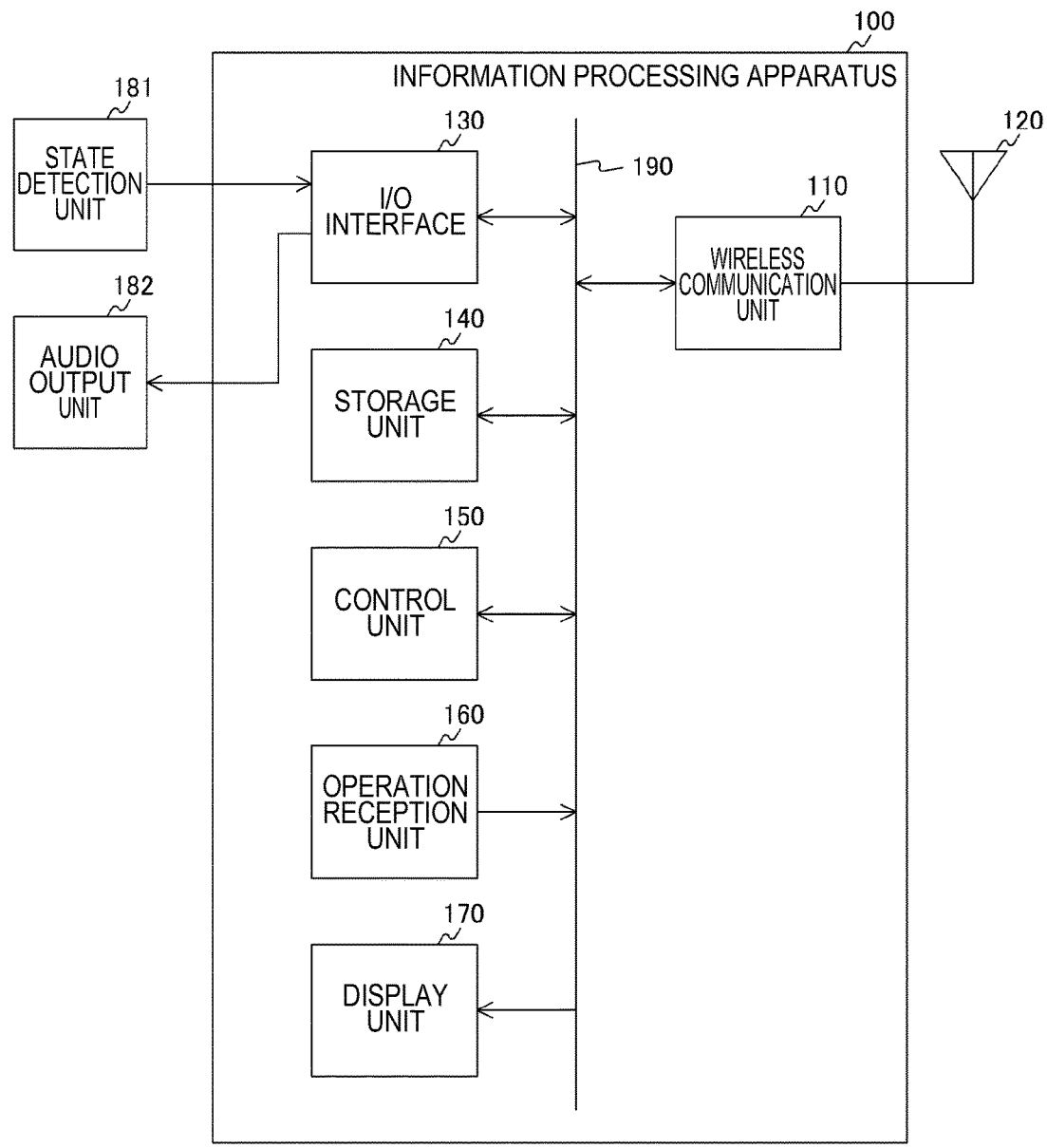
FIG. 2 is a block diagram which shows an internal configuration example of an information processing apparatus 100 according to the first embodiment of the present technology.

FIG. 2 is a block diagram which shows an internal configuration example of the information processing apparatus 100 according to the first embodiment of the present technology. Since the other information processing apparatuses (the information processing apparatuses 101 to 104, 200 to 205, and 300) also have substantially the same internal configuration as the information processing apparatus 100, only the information processing apparatus 100 is described herein, and description of the other information processing apparatuses will be omitted.

The information processing apparatus 100 includes a wireless communication unit 110, an antenna 120, an input/output (I/O) interface 130, a storage unit 140, a control unit 150, an operation reception unit 160, and a display unit 170. In addition, each of these units is connected to each other through a bus 190.

The wireless communication unit 110 is a module for transmitting or receiving radio waves through the antenna 120 (for example, a cellular modem and a wireless local area network (LAN) modem). For example, the wireless communication unit 110 can perform wireless communication in a wireless LAN communication system. In addition, for example, the wireless communication unit 110 may perform wireless communication in a communication system of 3GPP specifications. Moreover, for example, the wireless communication unit 110 may perform wireless communication using millimeter-wave communication (60 GHz and the like), 900 MHz/2.4 GHz/5 GHz wireless LAN, or ultra-wide band (UWB). Moreover, for example, the wireless communication unit 110 may perform wireless communication using visible light communication or near field communication (NFC).

Moreover, for example, the wireless communication unit 110 can transfer each piece of information to the other information processing apparatuses via a certain information processing apparatus based on a control of the control unit 150. A method of delivering information to distant information processing apparatuses by performing mutual data transfer (a so-called, bucket relay) is referred to as a multi-hop relay. Moreover, a network for performing the multi-hop relay is generally known as a mesh network. In this manner, when data transfer is performed, the wireless communication unit 110 performs an exchange of signals for generating or updating a multi-hop communication path using wireless communication with another information processing apparatus.

Moreover, the wireless communication unit 110 may perform wireless communication in which radio waves (electromagnetic waves) are used, and may perform wireless communication in which a medium other than radio waves is used (for example, wireless communication performed by using a magnetic field).

The I/O interface 130 is an interface with an external device such as a sensor or an actuator which operates in conjunction with the information processing apparatus 100. In FIG. 2, an example in which a state detection unit 181 and an audio output unit 182 are connected to the I/O interface 130 as external devices is shown. In addition, an example in which the state detection unit 181 and the audio output unit 182 are provided outside the information processing apparatus 100 is shown in FIG. 2, but all or some of these units may be embedded in the information processing apparatus 100. Furthermore, an external device such as a wearable computer or a wearable terminal may be connected to the I/O interface 130 and used.

The state detection unit 181 detects a state (for example, a position, a posture, a movement distance) of the information processing apparatus 100 by detecting an acceleration, a motion, an inclination, and the like of the information processing apparatus 100. Then, the state detection unit 181 outputs state information on the detected state to the control unit 150 through the I/O interface 130. For example, an acceleration sensor, a gyro sensor, and a global positioning system (GPS) can be used as the state detection unit 181.

The audio output unit 182 is an audio output unit (for example, a speaker) for outputting various types of voices based on a control of the control unit 150.

The storage unit 140 is a memory for storing various types of information. For example, various types of information (for example, a control program) required for the information processing apparatus 100 to perform a desired operation are stored in the storage unit 140. In addition, various types of content such as music content or image content (for example, moving image content and still image content) are stored in the storage unit 140.

The control unit 150 controls each unit of the information processing apparatus 100 based on the control program stored in the storage unit 140. For example, the control unit 150 performs signal processing on transmitted and received information. Moreover, the control unit 150 is realized by a central processing unit (CPU).

For example, when data is transmitted by the wireless communication unit 110 using wireless communication, the control unit 150 processes information read from the storage unit 140, a signal input from the I/O interface 130, and the like, and generates a chunk (a transmission packet) of data that is actually transmitted. Subsequently, the control unit 150 outputs the generated transmission packet to the wireless communication unit 110. In addition, the wireless communication unit 110 converts the transmission packet into a format of a communication system and the like for actual transmission, and transmits the converted transmission packet to the outside from the antenna 120.

In addition, for example, when data is received by the wireless communication unit 110 using wireless communication, the wireless communication unit 110 extracts a reception packet by performing signal processing, which is performed by a receiver in the wireless communication unit 110, on a radio wave signal received through the antenna 120. Then, the control unit 150 interprets the extracted reception packet. As a result of the interpretation, when it is determined that the extracted reception packet is data to be held, the control unit 150 writes the data into the storage unit 140. In addition, when it is determined that the extracted reception packet is data to be transferred to another information processing apparatus, the control unit 150 outputs the data to the wireless communication unit 110 as a transmission packet to be transferred to the other information processing apparatus. Moreover, when it is determined that the extracted reception packet is data to be output, the control unit 150 performs an output to the display unit 170 or an output to the outside (for example, the audio output unit 182) from the I/O interface 130.

For example, the control unit 150 can provide various types of content stored in the storage unit 140 to other information processing apparatuses using wireless communication.

In addition, for example, the control unit 150 transmits a stay request which requests a stay at a specific location to another information processing apparatus in a network, and performs control to give an incentive to the other information processing apparatus under a condition that the other information processing apparatus stays in the specific location.

Moreover, for example, the control unit 150 performs reception processing to receive a stay request, which requests a stay at a specific location, from another information processing apparatus in the network. In this case, the control unit 150 performs processing (for example, starting a specific application) based on the incentive given from the other information processing apparatus under the condition that the information processing apparatus 100 stays in a specific location.

The operation reception unit 160 is an operation reception unit which receives an operation input performed by the user, and outputs operation information in accordance with the received operation input to the control unit 150. The operation reception unit 160 is realized by, for example, a touch panel, a keyboard, a mouse, and a sensor (for example, a touch interface).

The display unit 170 is a display unit which displays various types of information based on a control of the control unit 150. A display panel such as an organic electro luminescence (EL) panel or a liquid crystal display (LCD) panel can be used as the display unit 170. The operation reception unit 160 and the display unit 170 can be integrally configured using a touch panel on which the user can perform an operation input by bringing his or her finger into contact with or close to a display surface of the touch panel.

[Communication Example]

Figure 3:
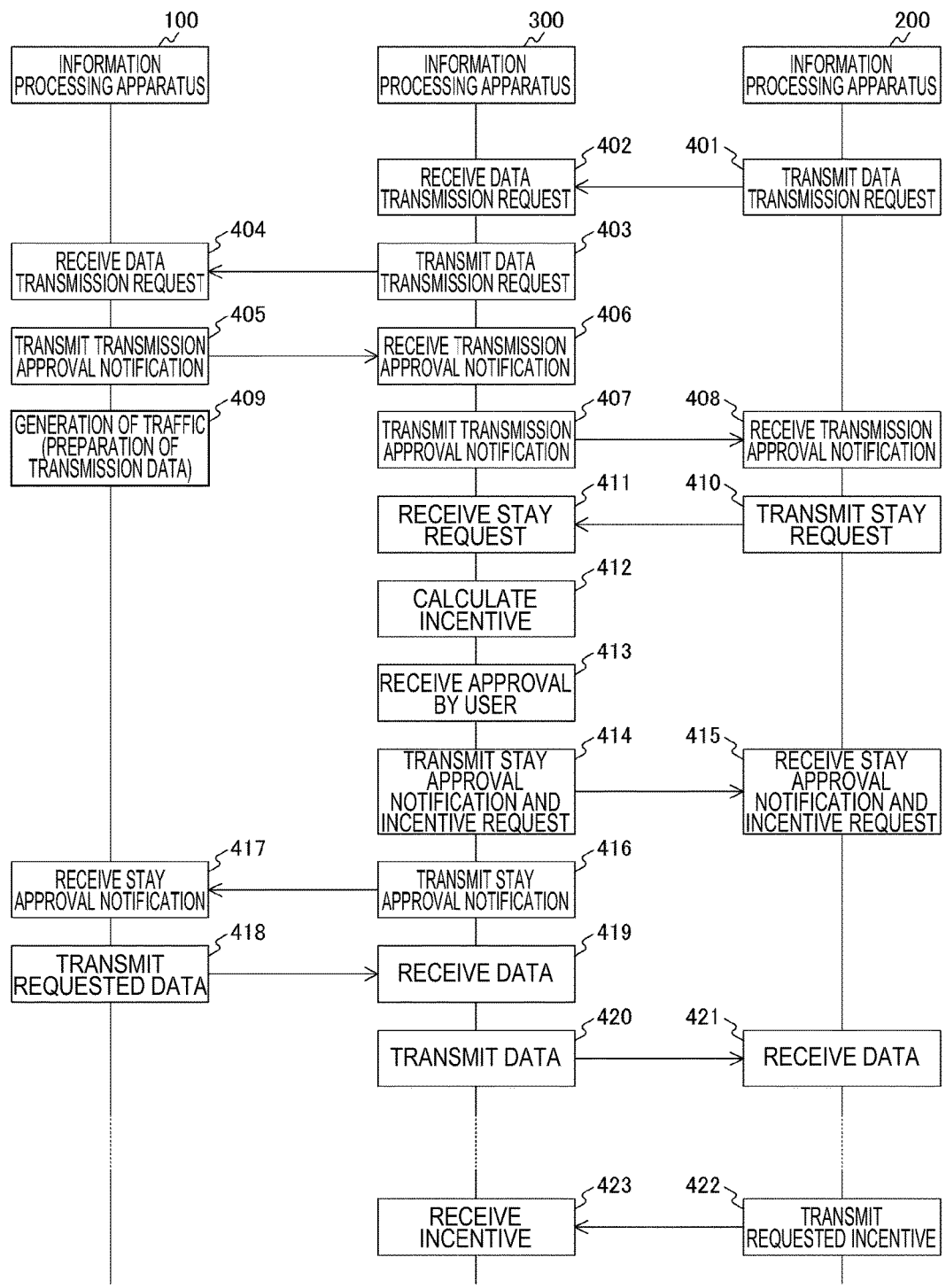
FIG. 3 is a sequence chart which shows a communication processing example among respective devices included in the communication system 10 according to the first embodiment of the present technology.

FIG. 3 is a sequence chart which shows a communication processing example among respective devices included in the communication system 10 according to the first embodiment of the present technology. FIG. 3 shows a communication processing example when the information processing apparatuses 100, 200, and 300 are in a topology shown in FIG. 1.

In addition, FIG. 3 shows an example of an information exchange performed between the information processing apparatuses 100 and 200 by setting the information processing apparatus 300 as a relay station. Specifically, FIG. 3 shows an example in which the information processing apparatus 200 requests that the information processing apparatus 100 transmit data stored in the information processing apparatus 100 via the information processing apparatus 300. Moreover, FIG. 3 shows an example in which the information processing apparatus 300 as a relay station calculates an incentive and requests the calculated incentive from the information processing apparatus 200 which has transmitted a stay request.

The information processing apparatus 200 transmits a data transmission request (a data transmission request signal) to the information processing apparatus 100 via the information processing apparatus 300 to receive data from the information processing apparatus 100 (401 to 404).

When the data transmission request is received (404), the information processing apparatus 100 determines whether it is possible to transmit the data according to the data transmission request. Then, when it is determined that it is possible to transmit the data according to the data transmission request, the information processing apparatus 100 transmits a packet (a transmission approval notification) which indicates that data transmission is possible to the information processing apparatus 200 via the information processing apparatus 300 (405 to 408).

In addition, when it is possible to transmit the data according to the data transmission request, the information processing apparatus 100 performs generation (preparation of transmission data) of data traffic (409). The preparation of transmission data may be performed at any timing until data transmission according to the data transmission request is started.

When the transmission approval notification is received (408), the information processing apparatus 200 calculates time required to receive the data according to the data transmission request. For example, the information processing apparatus 200 can calculate the time based on the amount of data and a minimum rate of data according to the data transmission request. At a time of calculating the time, an optimal rate may be used instead of the minimum rate depending on an environment. In addition, other communication rates may be used depending on environment. Moreover, in the first embodiment of the present technology, the time calculated in this manner is set as a desired time to stay near the information processing apparatus 300 (a stay time).

The information processing apparatus 200 transmits a packet (a request signal (a stay request)) including information (for example, a length of time (for example, 10 sec)) for specifying the time calculated in this manner to the information processing apparatus 300 (410 and 411). In this case, direct communication can be performed between the information processing apparatuses 200 and 300, and thus the information processing apparatus 200 directly transmits the stay request to the information processing apparatus 300 (410 and 411).

When the stay request is received (411), the information processing apparatus 300 calculates an incentive requested from the information processing apparatus 200 which has transmitted the stay request (412).

Subsequently, the information processing apparatus 300 notifies a user of an indication that the stay request is received. For example, it is possible to perform the notification to the user by displaying, for example, an indication that the stay request is received, the stay time according to the stay request (for example, 10 sec), and the calculated incentive (for example, a numerical value) on a display unit of the information processing apparatus 300. In addition, it is also possible to perform the notification to the user by outputting, for example, the indication that the stay request is received, the stay time according to the stay request, and the calculated incentive by voice.

When the notification is performed in this manner, the user determines whether to approve the stay request, and performs an operation input on whether to approve the stay request. FIG. 3 shows an example of a case in which the operation input to approve the stay request is received.

In this manner, when the operation input to approve the stay request by the user is received (413), the information processing apparatus 300 transmits a notification indicating that the stay request (a stay approval notification) is approved and an incentive request to the information processing apparatus 200 (414 and 415). The incentive request is information for requesting the calculated incentive.

In addition, the information processing apparatus 300 transmits an indication (the stay approval notification) that data transmission relay to the information processing apparatus 200 is allowed to the information processing apparatus 100 (416 and 417). In this case, direct communication can be performed between the information processing apparatuses 100 and 300, and thus the information processing apparatus 300 directly transmits the stay approval notification to the information processing apparatus 100 (416 and 417).

When the stay approval notification is received (417), the information processing apparatus 100 starts data transmission to the information processing apparatus 200 (418 to 421). While the data transmission is performed, the information processing apparatus 300 needs to stay in a range in which communication between the information processing apparatus 100 and the information processing apparatus 200 can be performed. That is, the information processing apparatus 300 needs to stay in the same location (or a peripheral location thereof) without moving from when the data transmission from the information processing apparatus 100 to the information processing apparatus 200 is started to when the stay time (for example, 10 sec) according to the stay request elapses.

Moreover, when the data transmission from the information processing apparatus 100 to the information processing apparatus 200 ends (418 to 421), the information processing apparatus 200 transmits the requested incentive to the information processing apparatus 300 (422 and 423). For example, information (for example, point information) which enables a user of the information processing apparatus 300 to use the requested incentive is transmitted to the information processing apparatus 300 from the information processing apparatus 200 (422 and 423). That is, the incentive is transferred from the user of the information processing apparatus 200 to the user of the information processing apparatus 300 (422 and 423). By the incentive transfer, a series of processing ends.

When an operation input not to approve the stay request is received, the information processing apparatus 300 transmits a notification (a stay non-approval notification) indicating that the stay request is not approved to the information processing apparatus 200. In this case, it is not possible to use the information processing apparatus 300 as a relay station, and thus the information processing apparatus 200 cannot receive data from the information processing apparatus 100. However, when a plurality of relay stations are present between the information processing apparatuses 100 and 200, even if a relay station (an optimal route) which is initially requested to stay does not approve, it is possible to perform a stay request to a next relay station (a next optimal route). In the same manner, it is possible to sequentially perform the stay request to third and subsequent relay stations (next optimal routes).

In addition, FIG. 3 shows an example in which whether the stay request is approved is determined by a manual operation of a user, but all stay requests may be approved by a setting set by the user in advance. In this case, whenever a stay request is received, the information processing apparatus 300 can automatically transmit the stay approval notification to the information processing apparatus which has transmitted the stay request.

In addition, it is also assumed that a relay station simultaneously (or at substantially the same time) receives a plurality of stay requests. In such a case, respective information processing apparatuses which transmit the stay requests may be displayed side by side in an order of reliability. In this case, a user can manually select an information processing apparatus which allows a relay. Alternatively, a high-level information processing apparatus with high reliability may be set to automatically allow a relay.

[Calculation Example of Incentive]

Figure 4:
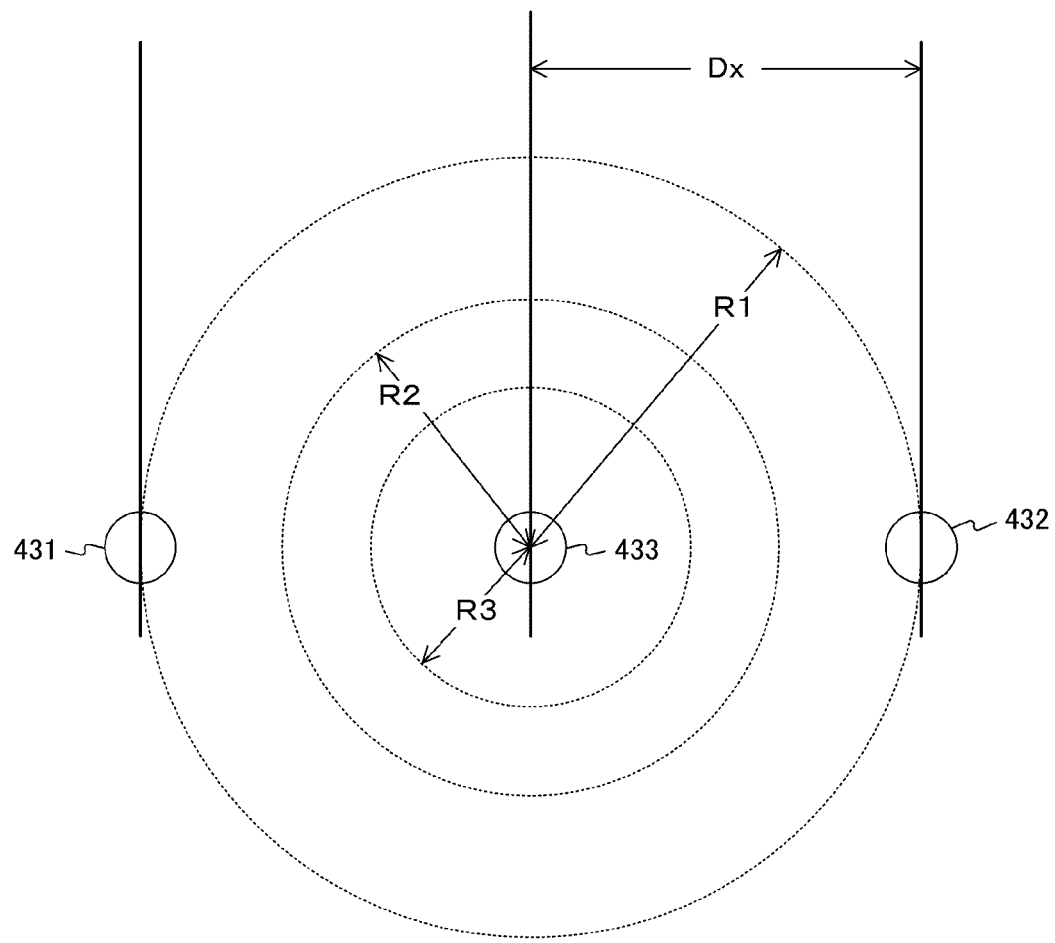
FIG. 4 is a diagram which shows a calculation example of an incentive by a relay station included in the communication system 10 according to the first embodiment of the present technology.

FIG. 4 is a diagram which shows a calculation example of an incentive by a relay station included in the communication system 10 according to the first embodiment of the present technology. FIG. 4 shows a method of calculating a weight of an incentive.

FIG. 4 shows an example of a case in which an information processing apparatus 433 is set as a relay station and data communication is performed between information processing apparatuses 431 and 432. An information processing apparatus 433 can calculate a weight of an incentive using a following expression 1.

$$W = w(t, n, d) \qquad \text{Expression 1}$$

Here, t is a value representing a stay time. In addition, n is a value representing the number of relay stations (num of relay nodes). Moreover, d is a value representing a distance among respective devices.

First, an example of calculating a weight W of an incentive based on a stay time is shown. For example, the weight W of the incentive is calculated so that the incentive is increased as a stay time is extended.

For example, when $t1 < t2 < t3$, $w(t1,n,d) < w(t3,n,d)$.

Next, an example of calculating the weight W of the incentive based on the number of relay stations is shown. For example, the weight W of the incentive is calculated so that the incentive is increased as the relay stations increase in number.

For example, when $n1 < n2 < n3$, $w(t,n1,d), w(t,n2,d) < w(t,n3,d)$.

Here, the number of relay stations can be set as, for example, the number of relay stations outside the information processing apparatuses 431 and 432. In this case, communication between respective networks is easily performed as the relay stations increase in number. Therefore, the weight W of the incentive is calculated to increase the incentive.

In addition, the number of relay stations can be set as, for example, the number of relay stations inside the information processing apparatuses 431 and 432. In this case, as the relay stations increase in number, relay stations to be selected are increased. For this reason, the weight W of the incentive is preferably calculated so that the incentive is decreased as the relay stations increase in number.

Next, an example of calculating the weight W of the incentive based on a distance between respective devices is shown. For example, the weight W of the incentive can be calculated so that the incentive is increased as a distance between a data transmission source and its device (a relay station) is equal to a distance between a data transmission destination and its device (a relay station).

For example, a distance between the information processing apparatuses 431 and 432 is set as 2×R1. In this case, when each of following conditions is satisfied, $$w(t,n,D1) < w(t,n,D2) < w(t,n,D3).$$

$$(R1-R3) < D0 < R1$$

$$(R1-R2) < D1 < (R1-R3)$$

$$0 < D2 < (R1-R2)$$

Here, as a calculation method of calculating a distance between devices, a calculation method using a result (for example, a received signal strength) of measuring a packet from other information processing apparatuses can be adopted. For example, it is possible to use Round Trip Time (RTT), Received Signal Strength Indicator (RSSI), and the like.

For example, RSSI of a packet received by the information processing apparatus 433 from the information processing apparatus 431 is set as RSSI_A. In addition, RSSI of a packet received by the information processing apparatus 433 from the information processing apparatus 432 is set as RSSI_B.

In this case, when the following expression is satisfied, it is possible to determine that a distance between the information processing apparatuses 433 and 431 is the same as or substantially the same as a distance between the information processing apparatuses 433 and 432.

$$RSSI\_A[dBm] \approx RSSI\_C[dBm]$$

In this manner, when the distance between the information processing apparatuses 433 and 431 is the same as or substantially the same as the distance between the information processing apparatuses 433 and 432, the weight W of the incentive is calculated to increase the incentive.

In this manner, a control unit of the information processing apparatus 433 can decide an incentive based on a relative positional relationship of each of the information processing apparatuses 431 to 433. In addition, the control unit of the information processing apparatus 433 can decide an incentive based on the number of information processing apparatuses (for example, the number of relay stations outside devices for performing data communication or the number of relay stations inside the devices) which can be involved in the reception of data in a network. Moreover, the control unit of the information processing apparatus 433 can decide an incentive based on a time for which the information processing apparatus 433 stays in a specific location.

[Operation Example of Information Processing Apparatus which Relays Data]

Figure 5:
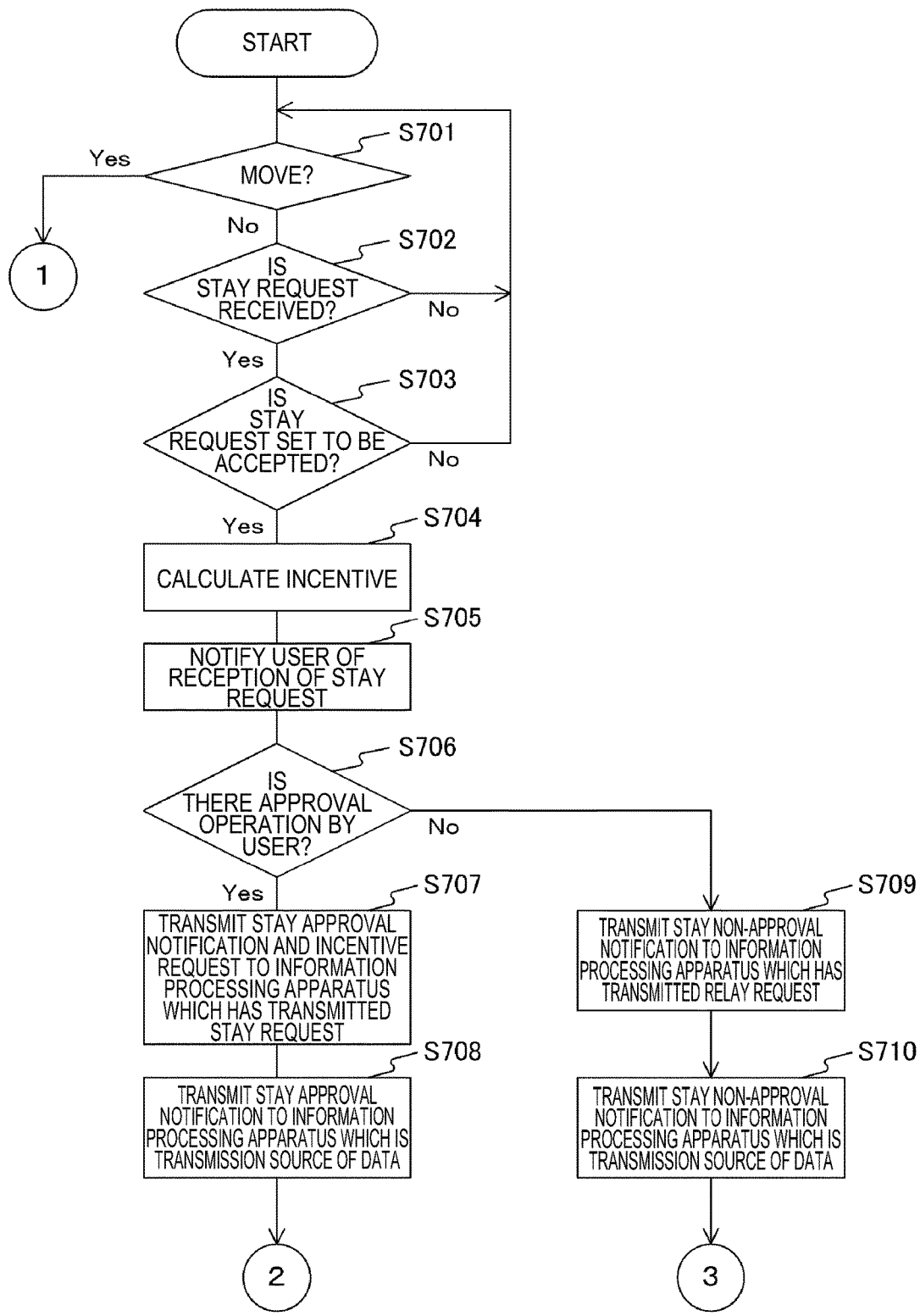
FIG. 5 is a flowchart which shows an example of a processing procedure of data relay processing by an information processing apparatus 300 according to the first embodiment of the present technology.
Figure 6:
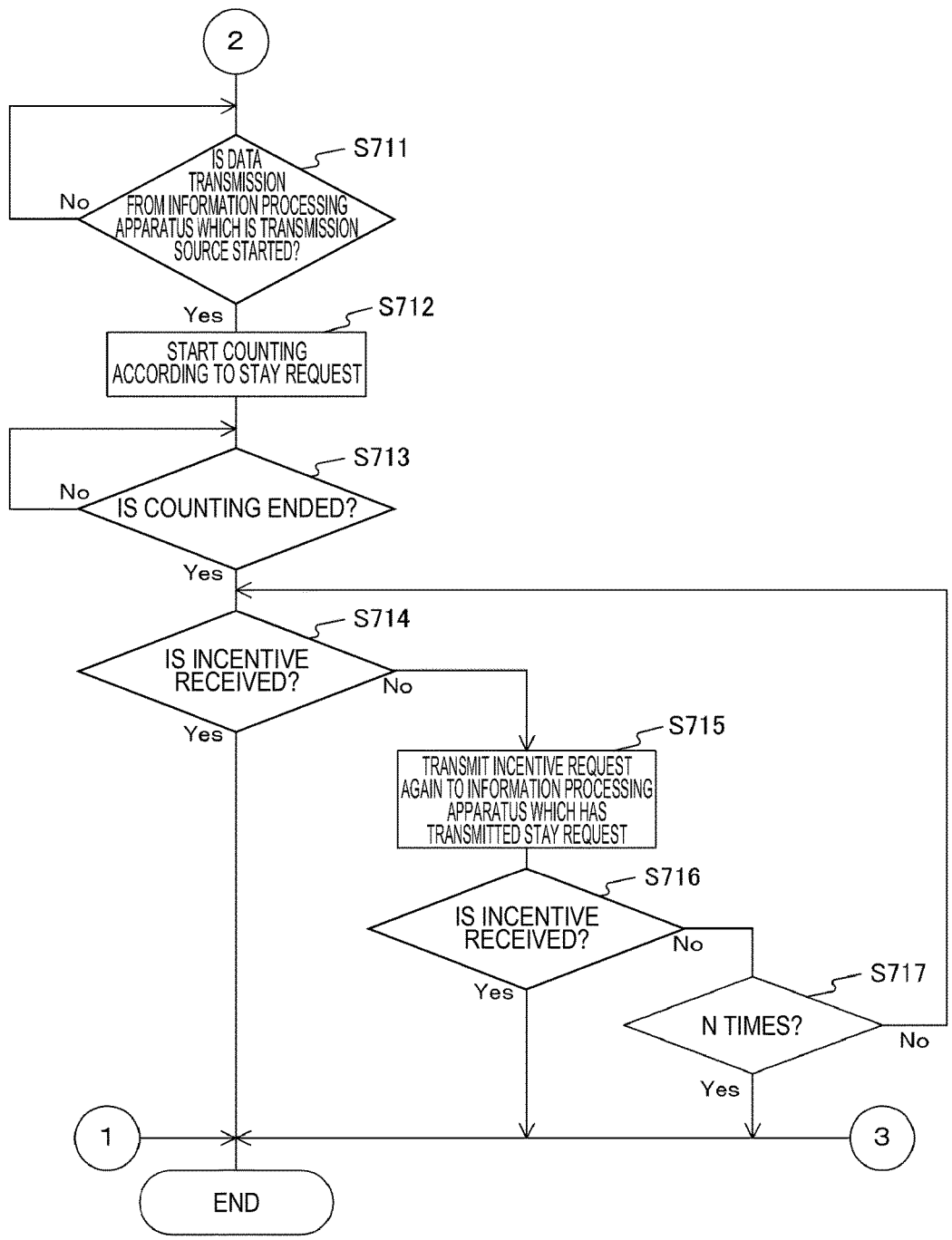
FIG. 6 is a flowchart which shows an example of the processing procedure of the data relay processing by the information processing apparatus 300 according to the first embodiment of the present technology.

FIGS. 5 and 6 are flowcharts which show examples of a processing procedure of data relay processing by the information processing apparatus 300 according to the first embodiment of the present technology.

A control unit (corresponding to the control unit shown in FIG. 2) of the information processing apparatus 300 determines whether the information processing apparatus 300 moves (step S701). In this case, the control unit of the information processing apparatus 300 may be configured to determine whether the information processing apparatus 300 performs an absolute position movement, and may be also configured to determine whether the information processing apparatus 300 performs a relative position movement. An absolute position movement means that the information processing apparatus 300 moves with respect to, for example, the ground. In this case, for example, the control unit of the information processing apparatus 300 can determine whether the information processing apparatus 300 moves based on state information from a state detection unit (corresponding to the state detection unit 181 shown in FIG. 2). Moreover, a relative position movement means that the information processing apparatus 300 moves in a relationship with positions of other information processing apparatuses, for example, on a basis of positions of the other information processing apparatuses. That is, in a determination of the relative position movement, for example, when a distance between the information processing apparatus 300 and the other information processing apparatuses is changed, it can be determined that the information processing apparatus 300 moved. When the information processing apparatus 300 moves (step S701), it is not preferable that the information processing apparatus be a relay station. Therefore, operations of data relay processing end.

When the information processing apparatus 300 does not move (step S701), the control unit of the information processing apparatus 300 determines whether a stay request has been received (step S702). Then, when the stay request has not been received (step S702), the procedure returns to step S701. In addition, when the stay request has been received (step S702), the control unit of the information processing apparatus 300 determines whether the information processing apparatus 300 is set to accept the stay request (step S703). This setting is performed by, for example, a user operation in advance. Then, when the information processing apparatus 300 is set not to accept the stay request (step S703), the procedure returns to step S701.

In addition, when the information processing apparatus 300 is set to accept the stay request (step S703), the control unit of the information processing apparatus 300 calculates an incentive to be requested from an information processing apparatus which has transmitted the stay request (step S704).

Subsequently, the control unit of the information processing apparatus 300 notifies a user that the stay request is received (step S705). Then, the control unit of the information processing apparatus 300 determines whether an operation input (an approval operation) to approve the stay request has been received by the user (step S706).

When the approval operation has been received (step S706), the control unit of the information processing apparatus 300 transmits a notification (a stay approval notification) indicating that the stay request is approved and an incentive request to the information processing apparatus which has transmitted the stay request (step S707).

In addition, the control unit of the information processing apparatus 300 transmits the stay approval notification to an information processing apparatus which is a transmission source of data (step S708).

Moreover, when an operation input (a non-approval operation) not to approve the stay request is received (step S706), the control unit of the information processing apparatus 300 transmits a notification (a stay non-approval notification) indicating that the stay request is not approved to the information processing apparatus which has transmitted the stay request (step S790).

In addition, the control unit of the information processing apparatus 300 transmits the stay non-approval notification to the information processing apparatus which is the transmission source of data (step S710).

Furthermore, the control unit of the information processing apparatus 300 determines whether data transmission from the information processing apparatus which is the transmission source of data has started (step S711). Then, when the data transmission has not started (step S711), monitoring is continuously performed. On the other hand, when the data transmission has started (step S711), the control unit of the information processing apparatus 300 starts counting according to the stay request (step S712).

Subsequently, the control unit of the information processing apparatus 300 determines whether the counting reaches a stay time according to the stay request (step S713). Then, monitoring is continuously performed until the counting reaches the stay time according to the stay request (step S713). In this case, the control unit of the information processing apparatus 300 determines whether the information processing apparatus 300 moved and, when the information processing apparatus 300 seemed to significantly move, a warning notification may be performed.

When the counting reaches the stay time according to the stay request (step S713), the control unit of the information processing apparatus 300 determines whether an incentive has been received from the information processing apparatus which has transmitted the stay request (step S714). Then, when the incentive has been received from the information processing apparatus which has transmitted the stay request (step S714), the operations of the data relay processing are ended.

Moreover, when the incentive is not received from the information processing apparatus which has transmitted the stay request (step S714), the control unit of the information processing apparatus 300 re-transmits the incentive request to the information processing apparatus which has transmitted the stay request (step S715).

Subsequently, the control unit of the information processing apparatus 300 determines whether the incentive has been received from the information processing apparatus which has transmitted the stay request (step S716). Then, when the incentive has been received from the information processing apparatus which has transmitted the stay request (step S716), the operations of the data relay processing are ended.

In addition, when the incentive is not received from the information processing apparatus which has transmitted the stay request (step S716), each processing described above is repeatedly performed for a predetermined number of times (for example, N times) (steps S714 to S717).

[Operation Example of Information Processing Apparatus which Requests Data Transmission]

Figure 7:
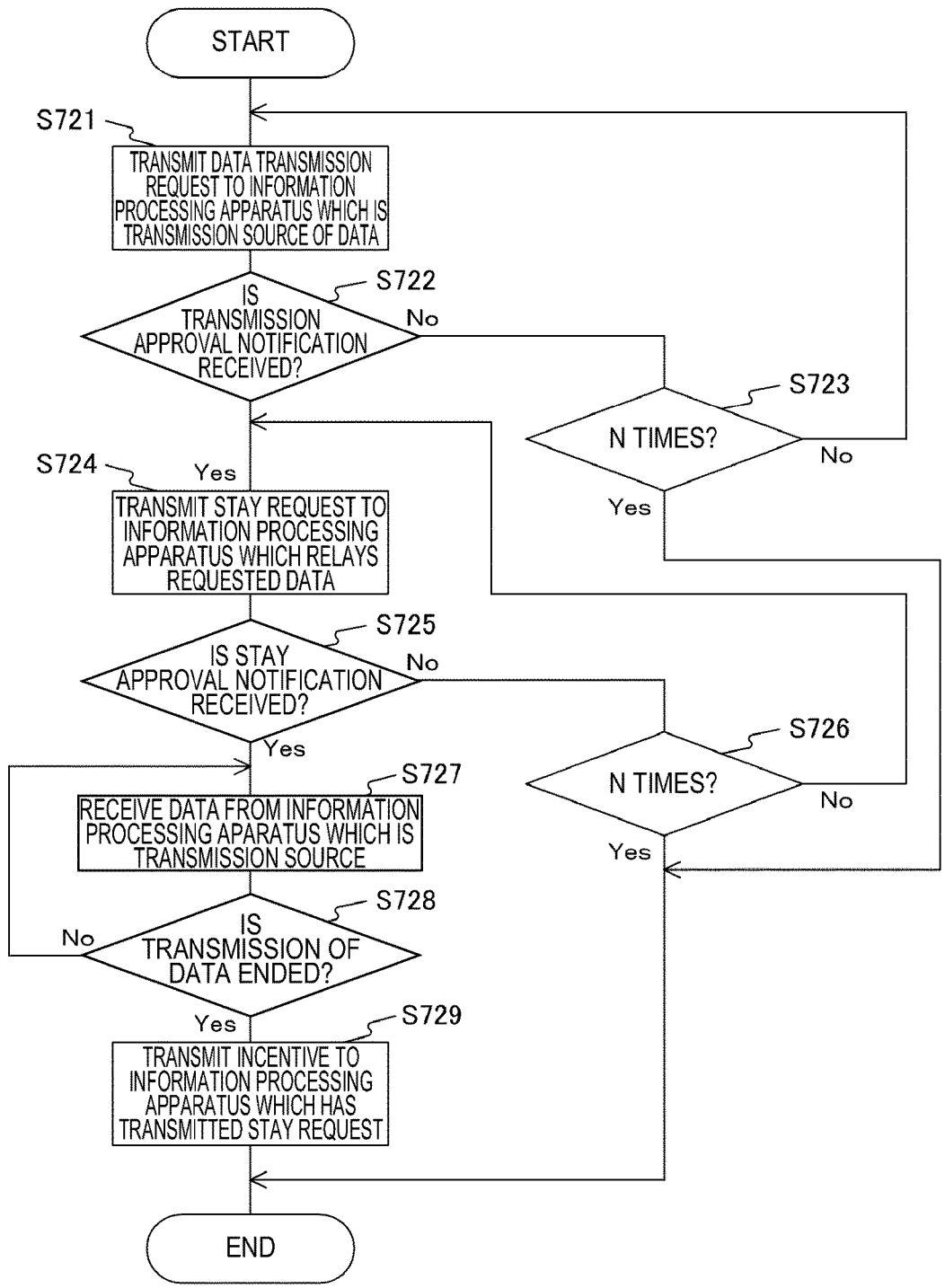
FIG. 7 is a flowchart which shows an example of a processing procedure of data reception processing by an information processing apparatus 200 according to the first embodiment of the present technology.

FIG. 7 is a flowchart which shows an example of a processing procedure of data reception processing by the information processing apparatus 200 according to the first embodiment of the present technology.

The control unit (corresponding to the control unit 150 shown in FIG. 2) of the information processing apparatus 200 transmits a data transmission request (a data transmission request signal) to the information processing apparatus 100 via the information processing apparatus 300 to receive data from the information processing apparatus 100 (step S721).

Subsequently, the control unit of the information processing apparatus 200 determines whether a transmission approval notification has been received (step S722). Then, when the transmission approval notification has not been received (step S722), each processing described above is repeatedly performed for a predetermined number of times (for example, N times) (steps S721 to S723).

When the transmission approval notification is received (step S722), the control unit of the information processing apparatus 200 calculates a time required to receive the data according to the data transmission request. Then, the control unit of the information processing apparatus 200 transmits a packet (a request signal (a stay request)) including the time calculated in this manner to the information processing apparatus 300 (step S724).

Subsequently, the control unit of the information processing apparatus 200 determines whether a stay approval notification has been received (step S725). Then, when the stay approval notification has not been received (step S725), each processing described above is repeatedly performed for a predetermined number of times (for example, N times) (steps S724 to S726).

When the stay approval notification is received (step S725), the control unit of the information processing apparatus 200 performs reception processing for receiving the data from the information processing apparatus 100 (step S727). Then, the control unit of the information processing apparatus 200 determines whether data transmission from the information processing apparatus 100 has ended (step S728). When the data transmission from the information processing apparatus 100 has not ended (step S728), the procedure returns to step S727.

When the data transmission from the information processing apparatus 100 has ended (step S728), the control unit of the information processing apparatus 200 transmits a requested incentive to the information processing apparatus 300 (step S729).

[Operation Example of Information Processing Apparatus for Transmitting Data]

Figure 8:
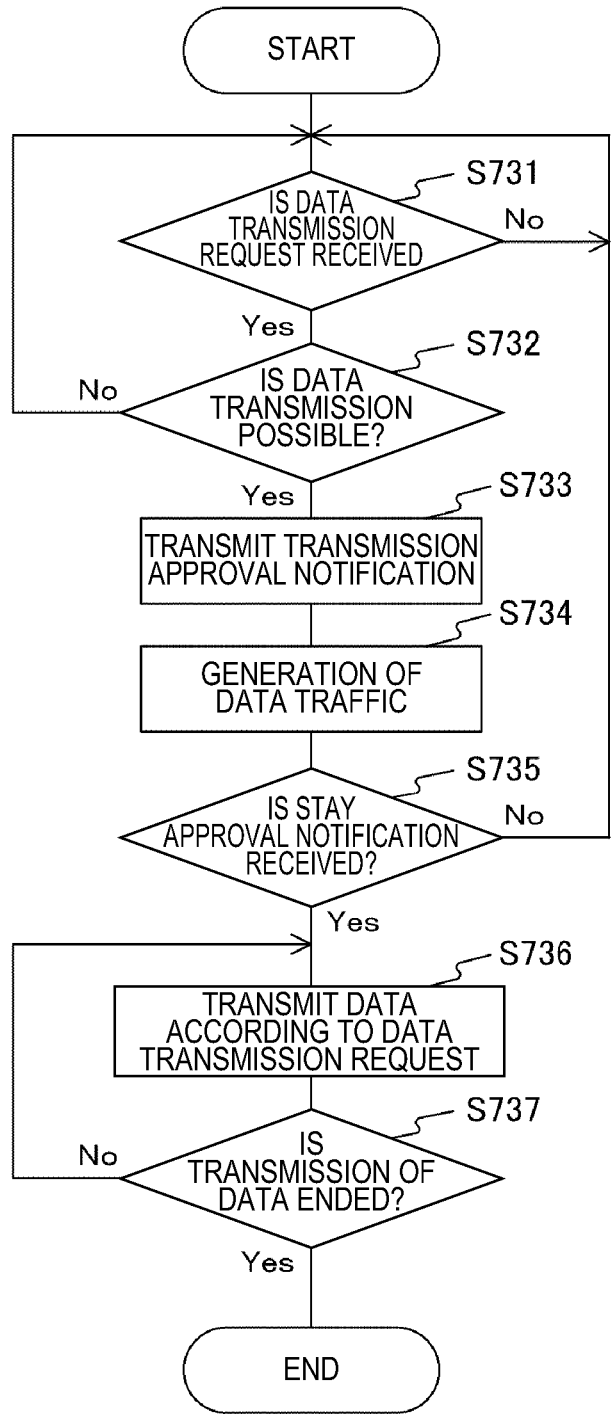
FIG. 8 is a flowchart which shows an example of a processing procedure of data transmission processing by the information processing apparatus 100 according to the first embodiment of the present technology.

FIG. 8 is a flowchart which shows an example of a processing procedure of data transmission processing by the information processing apparatus 100 according to the first embodiment of the present technology.

The control unit 150 of the information processing apparatus 100 determines whether a data transmission request has been received (step S731). Then, when the data transmission request has not been received (step S731), monitoring is continuously performed.

When the data transmission request is received (step S731), the control unit 150 of the information processing apparatus 100 determines whether data transmission according to the data transmission request can be performed (step S732). Then, when the data transmission according to the data transmission request can be performed (step S732), the information processing apparatus 100 transmits a packet (a transmission approval notification) which shows that the data transmission can be performed to the information processing apparatus 200 via the information processing apparatus 300 (step S733).

In addition, when the data transmission according to the data transmission request can be performed, the control unit 150 of the information processing apparatus 100 performs generation (preparation of transmission data) of data traffic (step S734).

Subsequently, the control unit 150 of the information processing apparatus 100 determines whether a stay approval notification has been received (step S735). When the stay approval notification has not been received (step S735), the procedure returns to step S731.

When the stay approval notification is received (step S735), the control unit 150 of the information processing apparatus 100 starts the data transmission to the information processing apparatus 200 (step S736). Then, the control unit 150 of the information processing apparatus 100 determines whether the data transmission to the information processing apparatus 200 has ended (step S737). Then, when the data transmission to the information processing apparatus 200 has not ended (step S737), the procedure returns to step S736. In addition, when the data transmission to the information processing apparatus 200 has ended (step S737), operations of data transmission processing are ended.

[Example in which Information Processing Apparatus which Performs Stay Request Calculates Incentive]

In the above, an example in which a relay station (the information processing apparatus 300) calculates an incentive is shown. Here, an information processing apparatus which performs a stay request may calculate an incentive. In the following, an example in which the information processing apparatus 200 which performs the stay request calculates an incentive is shown.

[Communication Example]

Figure 9:
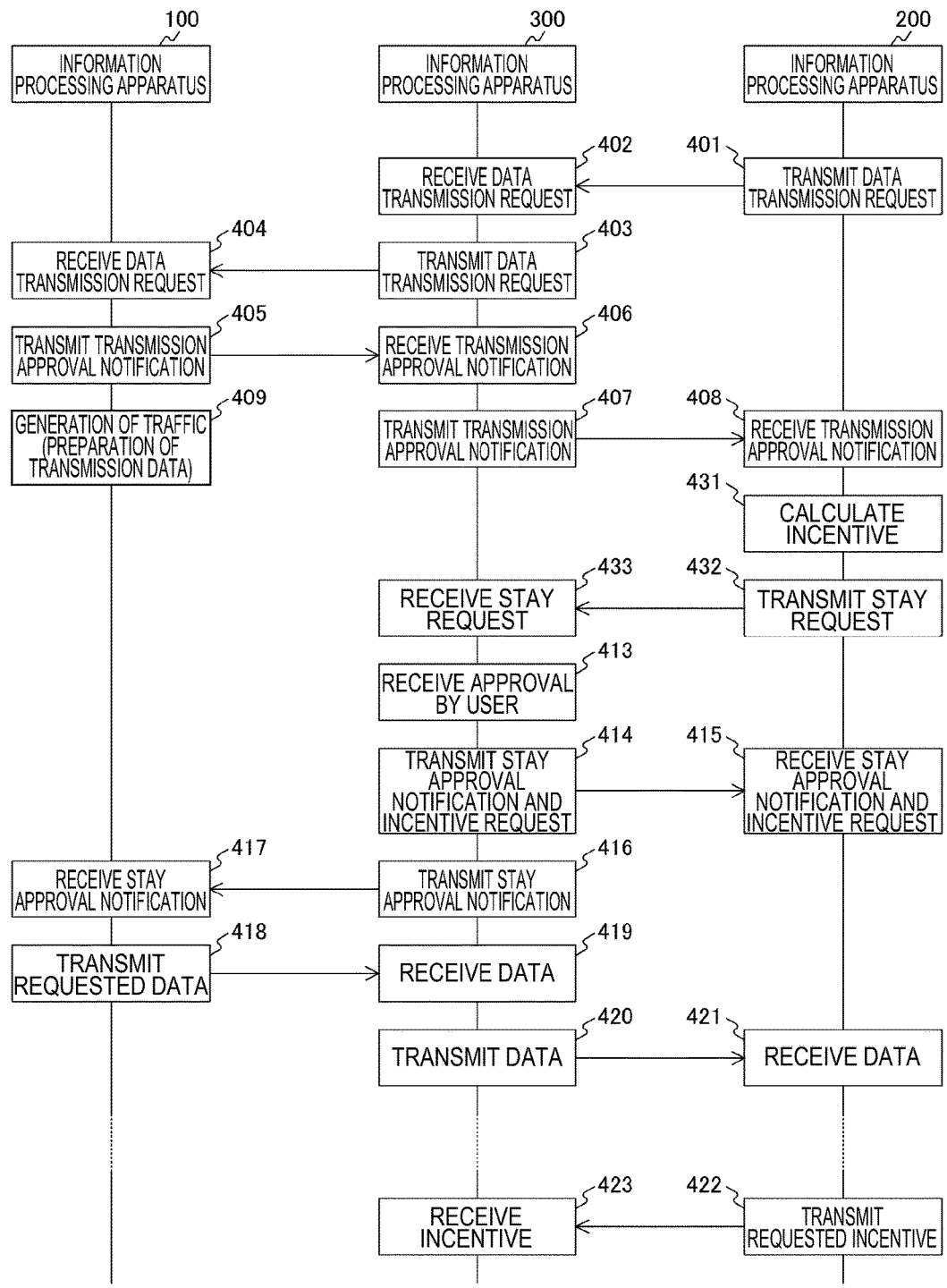
FIG. 9 is a sequence chart which shows a communication processing example among respective devices included in the communication system 10 according to the first embodiment of the present technology.

FIG. 9 is a sequence chart which shows a communication processing example among respective devices included in the communication system 10 according to the first embodiment of the present technology. FIG. 9 is a modification of a portion of FIG. 3. Therefore, portions common with FIG. 3 will be given the same reference numerals as in FIG. 3, and description of these common portions will be partially omitted.

When a transmission approval notification is received (408), the information processing apparatus 200 calculates an incentive (431). Then, the information processing apparatus 200 transmits a stay request including a calculated incentive to the information processing apparatus 300 (432 and 433). Accordingly, the information processing apparatus 300 can use the incentive calculated by the information processing apparatus 200.

[Operation Example of Information Processing Apparatus which Relays Data]

Figure 10:
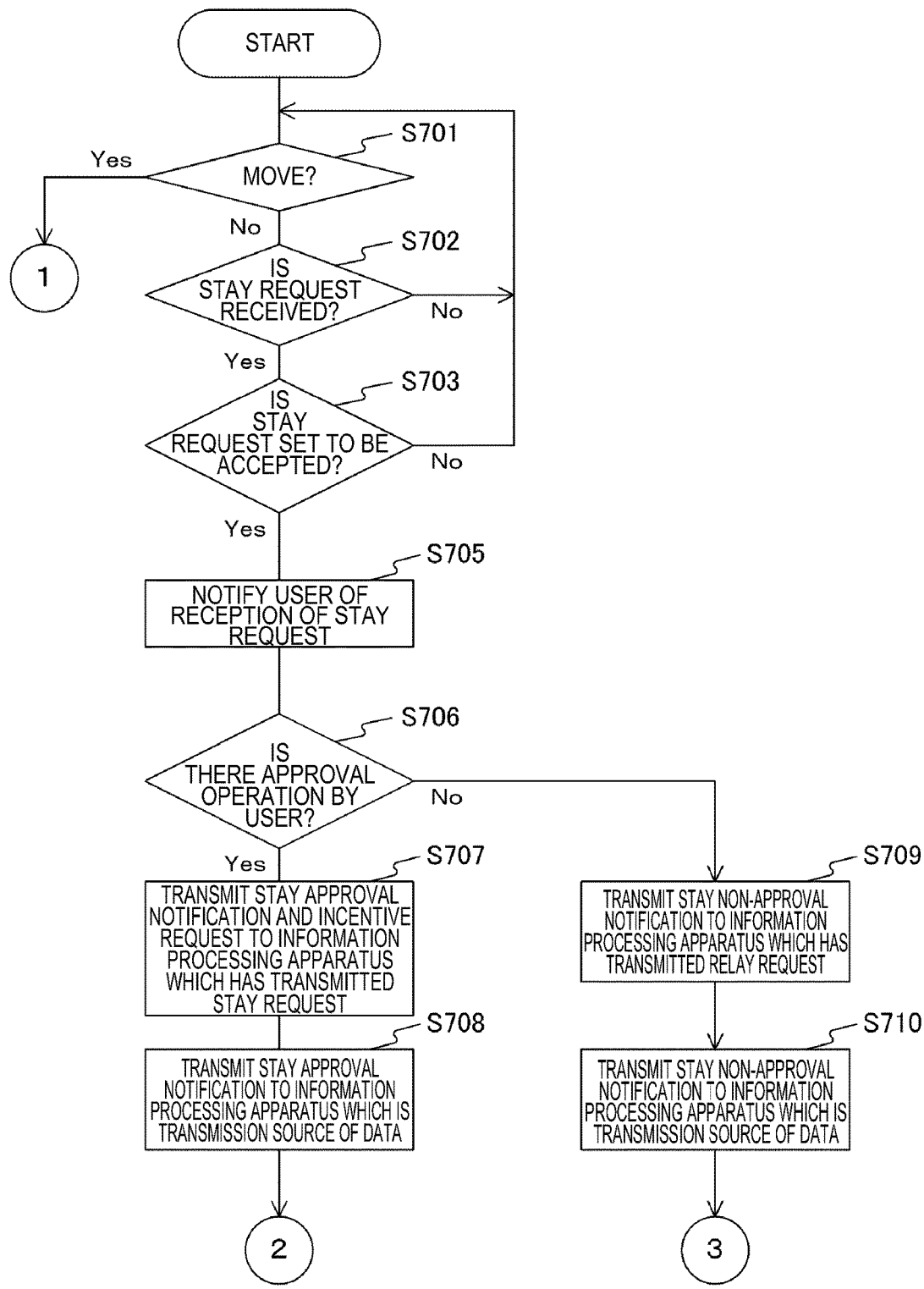
FIG. 10 is a flowchart which shows an example of the processing procedure of the data relay processing by the information processing apparatus 300 according to the first embodiment of the present technology.

FIG. 10 is a flowchart which shows an example of the processing procedure of the data relay processing by the information processing apparatus 300 according to the first embodiment of the present technology. FIG. 10 is a modification of a portion of FIG. 5. Therefore, portions common with FIG. 5 will be given the same reference numerals as in FIG. 5, and description of these common portions will be partially omitted.

Specifically, since the information processing apparatus 200 calculates an incentive, the information processing apparatus 300 does not calculate the incentive. Therefore, incentive calculation processing (step S704) shown in FIG. 5 will be omitted.

[Operation Example of Information Processing Apparatus which Requests Data Transmission]

Figure 11:
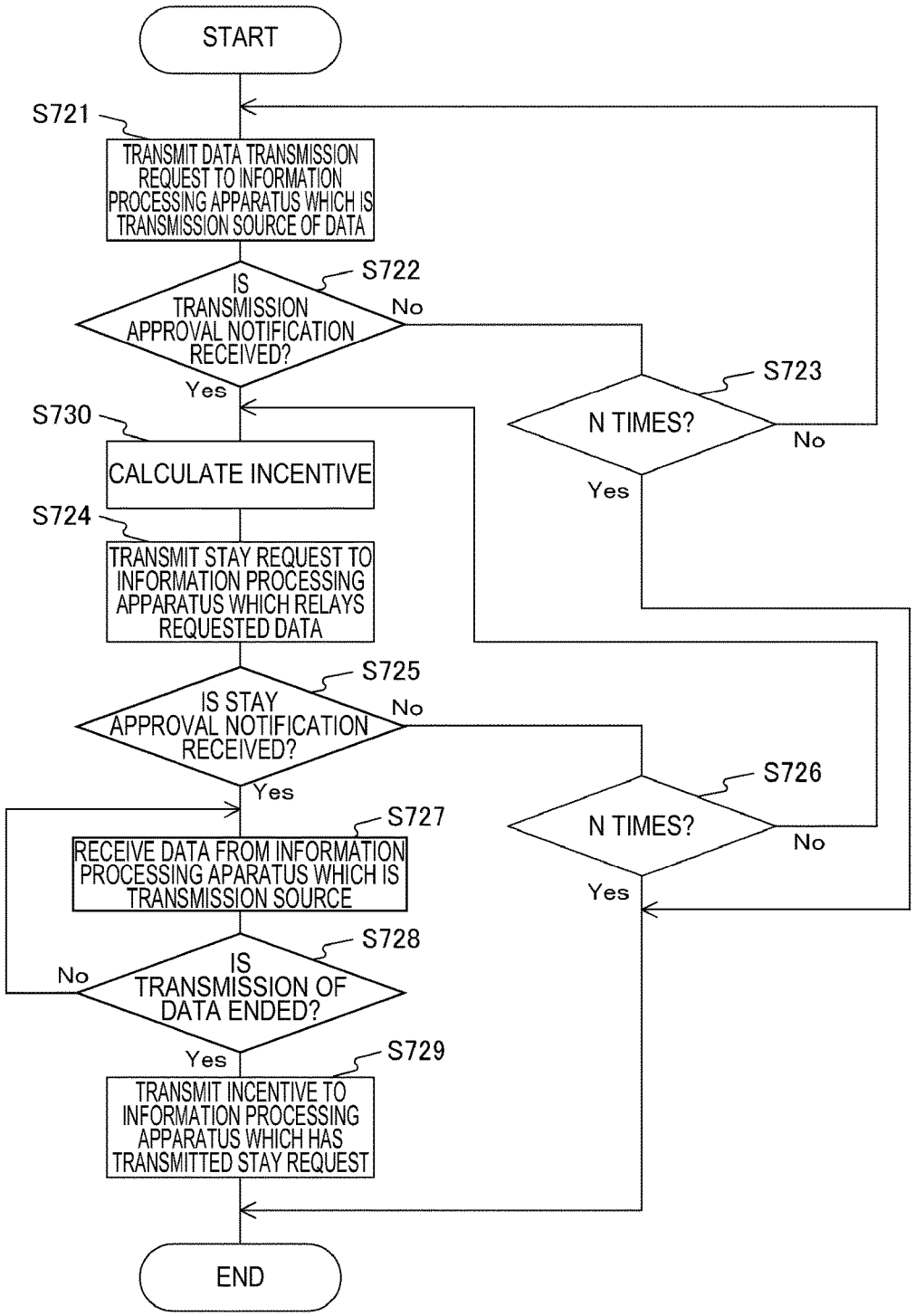
FIG. 11 is a flowchart which shows an example of the processing procedure of the data reception processing by the information processing apparatus 200 according to the first embodiment of the present technology.

FIG. 11 is a flowchart which shows an example of the processing procedure of the data reception processing by the information processing apparatus 200 according to the first embodiment of the present technology. FIG. 11 is a modification of a portion of FIG. 7. Therefore, portions common with FIG. 7 will be given the same reference numerals as in FIG. 7, and description of these common portions will be partially omitted.

When a transmission approval notification is received (step S722), the control unit of the information processing apparatus 200 calculates an incentive given to a relay station (step S730). Then, the control unit of the information processing apparatus 200 transmits a stay request including the incentive calculated in this manner to the information processing apparatus 300 (step S724).

2. Second Embodiment

The first embodiment of the present technology showed an example in which an incentive is given to a relay station for performing communication between information processing apparatuses and for causing the relay station to stay in a specific location during the communication. Here, in wide commercial facilities such as supermarkets, it is assumed that parents want their child to be in a certain specific location (for example, a playground in the commercial facility) when a family shops. However, it is assumed that the child is less likely to stay in a range that the parents want as long as the other person (commercial facility personnel) does not monitor.

Therefore, the second embodiment of the present technology shows an example in which a user (for example, the child) who owns an information processing apparatus can be caused to stay in a specific location (for example, the playground of a commercial facility). Configurations of information processing apparatuses in the second embodiment of the present technology are substantially the same as the information processing apparatuses 100, 200, and 300 shown in FIG. 2 and the like. Therefore, portions common with the first embodiment of the present technology will be given by the same reference numerals as in the first embodiment of the present technology, and description of these common portions will be partially omitted.

[Behavior Example of Child]

Figure 12:
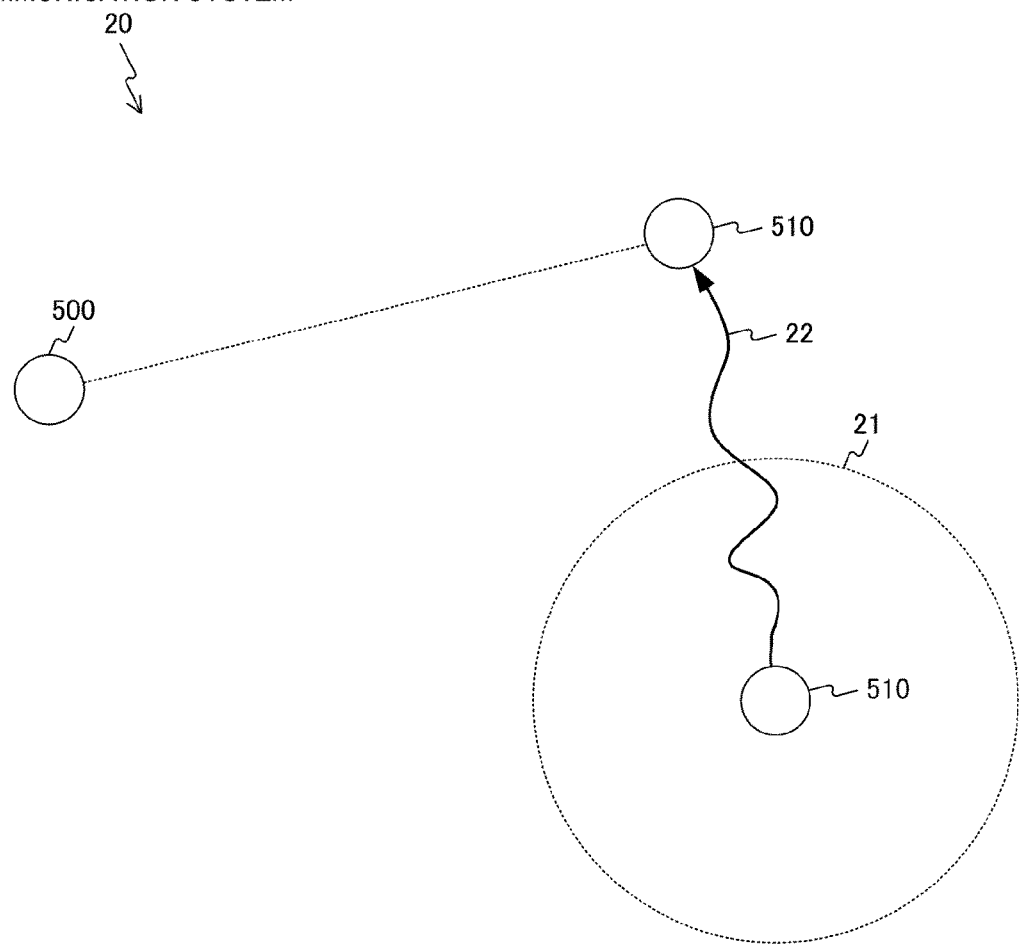
FIG. 12 is a diagram which shows an example of a communication system 20 made of information processing apparatuses 500 and 510 according to a second embodiment of the present technology.

FIG. 12 is a diagram which shows an example of a communication system 20 made of information processing apparatuses 500 and 510 according to the second embodiment of the present technology.

For example, it is assumed that the information processing apparatus 500 is carried by a mother and the information processing apparatus 510 is carried by a child of the mother. In addition, a circular dotted line 21 is assumed to be the playground of a commercial facility.

For example, as shown in FIG. 12, it is assumed that the mother carrying the information processing apparatus 500 and the child carrying the information processing apparatus 510 come to the commercial facility for shopping. In this case, it is considered that the mother wants the child to play in the playground (the circular dotted line 21) in the commercial facility during the shopping. However, it is assumed that, when the child gets tired of playing in the playground (the circular dotted line 21), the child leaves the playground (the circular dotted line 21) as shown by an arrow 22.

Therefore, in the second embodiment of the present technology, the mother carrying the information processing apparatus 500 gives an incentive (for example, a right to play a game) to the child carrying the information processing apparatus 510. Accordingly, it is possible to induce the child to stay in a place the mother desires.

[Configuration Example of Communication System]

Figure 13:
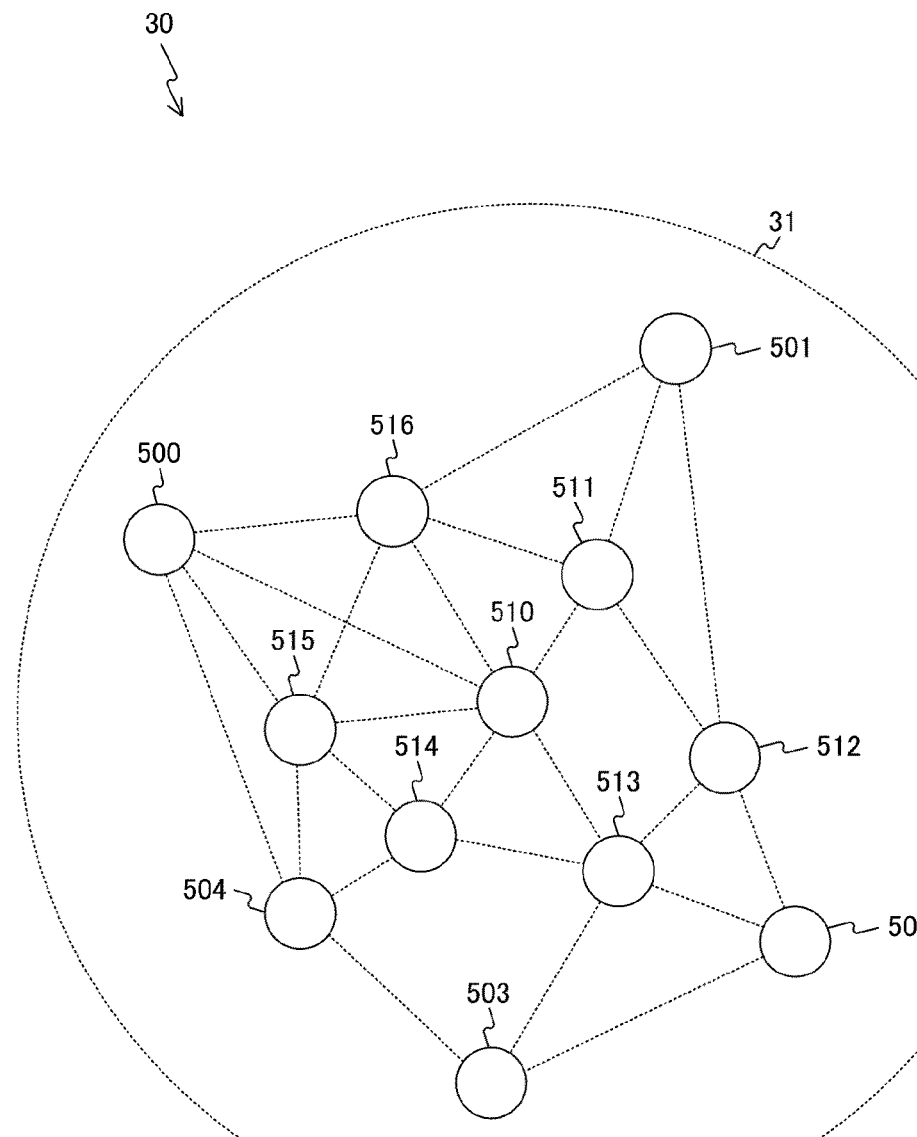
FIG. 13 is a diagram which shows a system configuration example of a communication system 30 according to the second embodiment of the present technology.

FIG. 13 is a diagram which shows a system configuration example of a communication system 30 according to the second embodiment of the present technology.

The communication system 30 includes information processing apparatuses 500 to 504 and 510 to 516.

As described above, the information processing apparatus 500 is an information processing apparatus carried by a mother, and the information processing apparatus 510 is an information processing apparatus carried by a child of the mother.

Moreover, the information processing apparatuses 511 to 516 present in the vicinity of the information processing apparatus 510 are assumed to be information processing apparatuses carried by children of other parents (who are carrying the information processing apparatuses 501 to 504), respectively. FIG. 13 schematically shows a mesh basic service set (BSS) formed by each of the information processing apparatuses using a circular dotted line 31.

[Communication Example]

Figure 14:
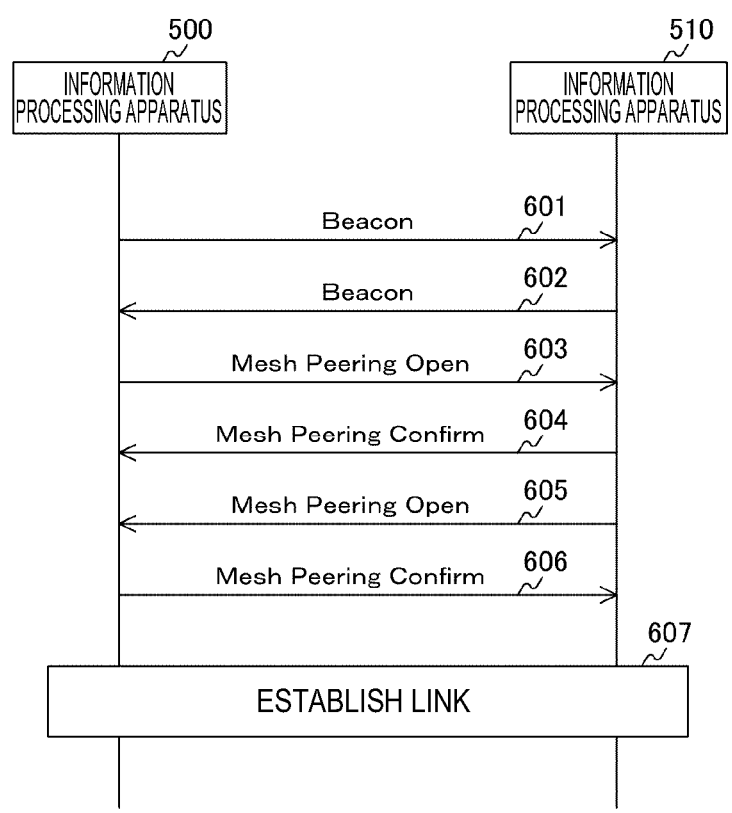
FIG. 14 is a sequence chart which shows a communication processing example among respective devices included in a communication system 10 according to the second embodiment of the present technology.

FIG. 14 is a sequence chart which shows a communication processing example among respective devices included in a communication system 10 according to the second embodiment of the present technology. FIG. 14 shows a communication processing example when the information processing apparatuses 500 and 510 are present in the topology shown in FIG. 1. In addition, FIG. 14 shows an example of pairing (Peering) performed between the information processing apparatuses 500 and 510.

First, a mother carrying the information processing apparatus 500 induces a child carrying the information processing apparatus 510 to a desired location (for example, a playground). Therefore, a Mesh Peer Link is established among the information processing apparatus 500 carried by the mother, the information processing apparatus 510 carried by the child, and other information processing apparatuses present in the vicinity of the location the child is desired to stay in to participate in a Mesh-BSS.

In this manner, after participating in the Mesh-BSS, the information processing apparatus 500 performs setting for controlling an incentive for the information processing apparatus 510.

Specifically, the information processing apparatus 500 and the information processing apparatus 510 perform a mutual exchange of beacons, and mutually confirm a presence as a peripheral information processing apparatus (601 and 602).

For example, the mother designates a mesh ID and a mesh configuration in the information processing apparatus 500. Accordingly, the information processing apparatus 500 transmits a beacon including the information (the mesh ID and the mesh configuration) (601). The information processing apparatus 510 which received the beacon displays an indication that the beacon is received on a display unit. In this case, it is assumed that the mother also sets a mesh ID and mesh configuration in the information processing apparatus 510 in advance. Here, the mesh ID set in advance in the information processing apparatus 510 is assumed to be the same mesh ID as the mesh ID designated in the information processing apparatus 500. In addition, the mesh configuration set in advance in the information processing apparatus 510 is assumed to be the same mesh configuration as the mesh configuration designated in the information processing apparatus 500. In this manner, the information processing apparatus 500 and the information processing apparatus 501 mutually transmit and receive a beacon including the same information (mesh ID and mesh configuration) (601 and 602). Accordingly, the information processing apparatus 500 and the information processing apparatus 501 can mutually detect that their devices are present in a range in which direct communication is possible. It is also assumed that the same mesh ID and the same mesh configuration are not set in advance. In this case, a mesh ID and a mesh configuration designated by the information processing apparatus 500 are selected by the mother, and thereby it is possible to designate partner devices which are peer linked on the information processing apparatus 510 side.

Subsequently, the information processing apparatuses 500 and 510 exchange a mesh peering open frame (603 and 605) and a mesh peering confirm frame (604 and 606). Accordingly, a Mesh Peer Link is established (607). The Mesh Peering open frame and the Mesh Peering confirm frame may be transmitted first by either of the information processing apparatuses. In addition, Mesh Peering open and Mesh Peering confirm are setting procedures performed to establish a mutual communication path by mesh devices having a matched mesh profile.

[Each Frame Example]

Figure 15:
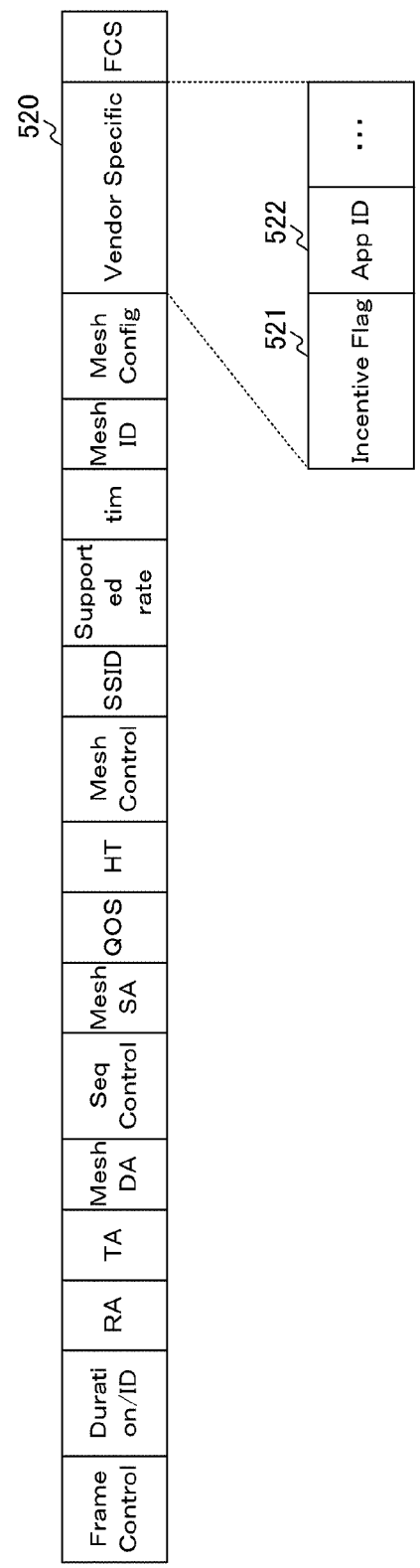
FIG. 15 is a diagram which shows a configuration example of a frame exchanged between respective information processing apparatuses included in the communication system 30 according to the second embodiment of the present technology.
Figure 16:
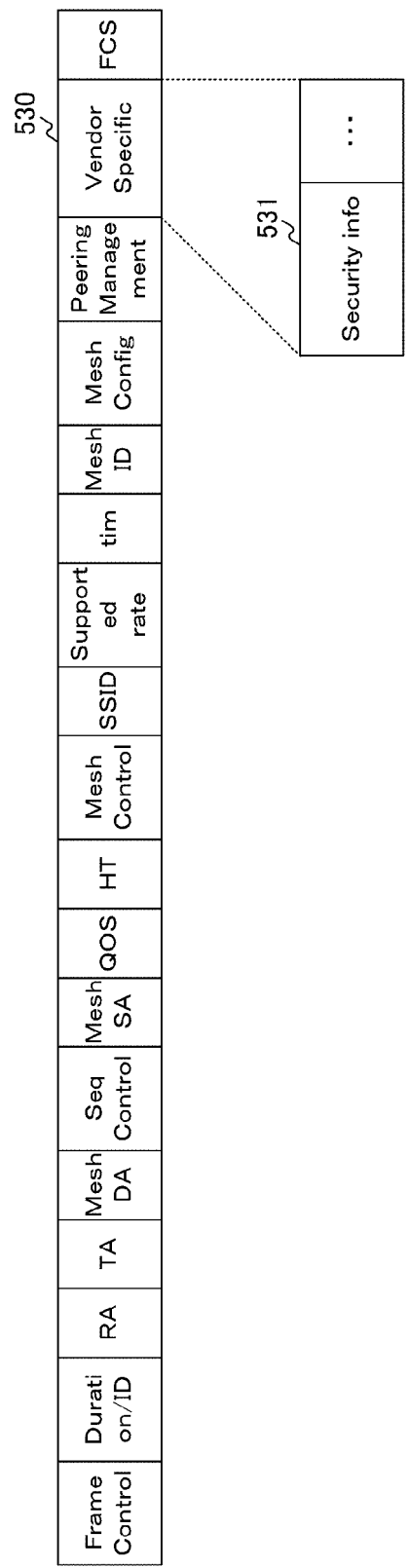
FIG. 16 is a diagram which shows a configuration example of a frame exchanged between respective information processing apparatuses included in the communication system 30 according to the second embodiment of the present technology.

FIGS. 15 to 17 are diagrams which show configuration examples of a frame exchanged between respective information processing apparatuses included in the communication system 30 according to the second embodiment of the present technology.

FIG. 15 shows a configuration example of a beacon frame and FIG. 16 shows a configuration example of a Mesh Peering open frame and a Mesh Peering confirm frame.

In addition, FIG. 17*a* shows a configuration example of a management setting request frame, FIG. 17*b* shows a configuration example of a management setting confirmation frame, and FIG. 17*c* shows a configuration example of a violation notification frame. Each of these frames will be described in detail with reference to FIGS. 27 and 28.

[Display Example]

FIGS. 18 to 26 are diagrams which show display screen examples displayed between respective information processing apparatuses included in the communication system 30 according to the second embodiment of the present technology. Each of these display screen examples will be described in detail with reference to FIGS. 27 and 28.

[Communication Example Until Start of Incentive Management]

Figure 27:
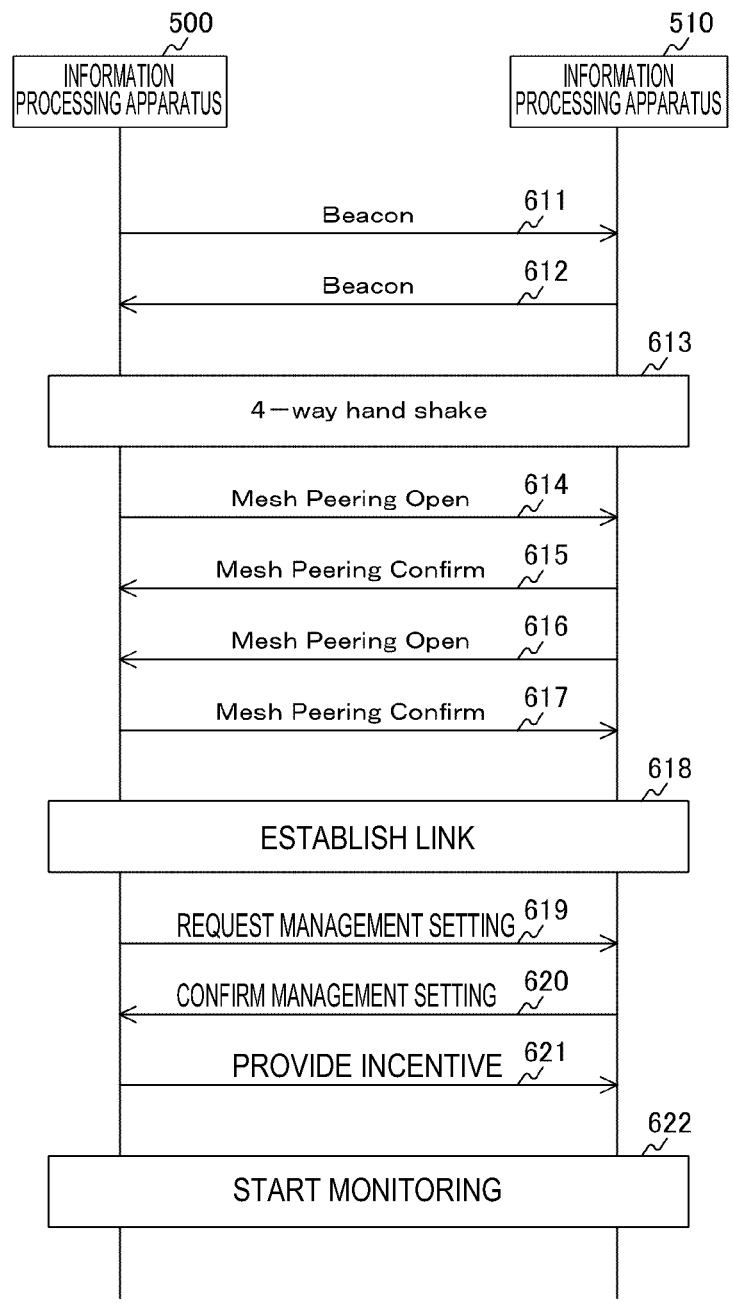
FIG. 27 is a sequence chart which shows a communication processing example among respective devices included in the communication system 10 according to the second embodiment of the present technology.

FIG. 27 is a sequence chart which shows a communication processing example between respective devices included in the communication system 10 according to the second embodiment of the present technology. FIG. 27 shows a communication processing example when the information processing apparatuses 500 and 510 are present in a topology shown in FIG. 27. In addition, FIG. 27 shows an example in which pairing is performed between the information processing apparatuses 500 and 510 until a start of an incentive management.

First, it is assumed that the information processing apparatuses 500 and 510 share a password in advance. Then, the information processing apparatuses 500 and 510 perform a mutual exchange of beacons (611 and 612). In this case, the beacon shown in FIG. 15 is used. For example, a beacon including an Incentive flag 521 and an App ID 522 is used.

Here, the Incentive Flag 521 is a flag which shows that an incentive management can be performed between information processing apparatuses that exchange the beacon or that the information processing apparatuses perform the incentive management. In addition, the App ID 522 is identification information for specifying an application which can be used in the incentive management. In a case of coping with a plurality of applications, a plurality of application IDs are classified and stored in the App ID 522.

In this manner, by performing the exchange of beacons (611 and 612), the information processing apparatuses 500 and 510 can recognize each other. For example, the information processing apparatuses 500 and 510 include a function of exchanging an incentive, and can recognize that they can perform the exchange of an incentive. Then, the information processing apparatuses 500 and 510 are listed as partners linked as a pair, and mutual authentication is started (613). That is, when the information processing apparatuses are established in a secure link with each other, the mutual authentication is performed by sharing a password and generating a key in 4-way hand shake (613).

Subsequently, the information processing apparatuses 500 and 510 exchange a Mesh Peering open frame (614 and 616) and a Mesh Peering confirm frame (615 and 617). Accordingly, a Mesh Peer Link is established (618). That is, a mutual path is established. In this case, the Mesh Peering open frame and the Mesh Peering confirm frame are used. For example, a frame including Security info 531 is used.

In this manner, after the path between the information processing apparatuses 500 and 510 is established, an incentive management procedure is performed.

Figure 18:
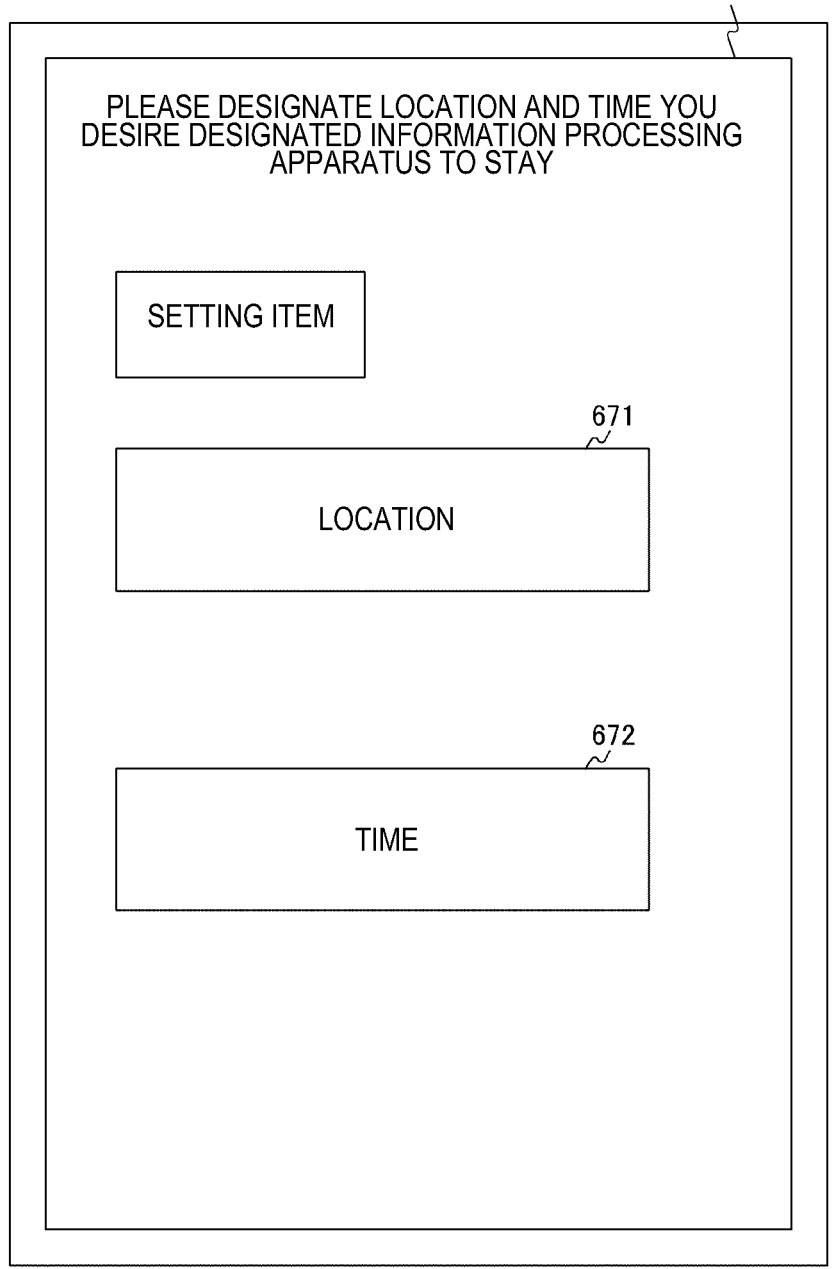
FIG. 18 is a diagram which shows a display screen example displayed between respective information processing apparatuses included in the communication system 30 according to the second embodiment of the present technology.
Figure 19:
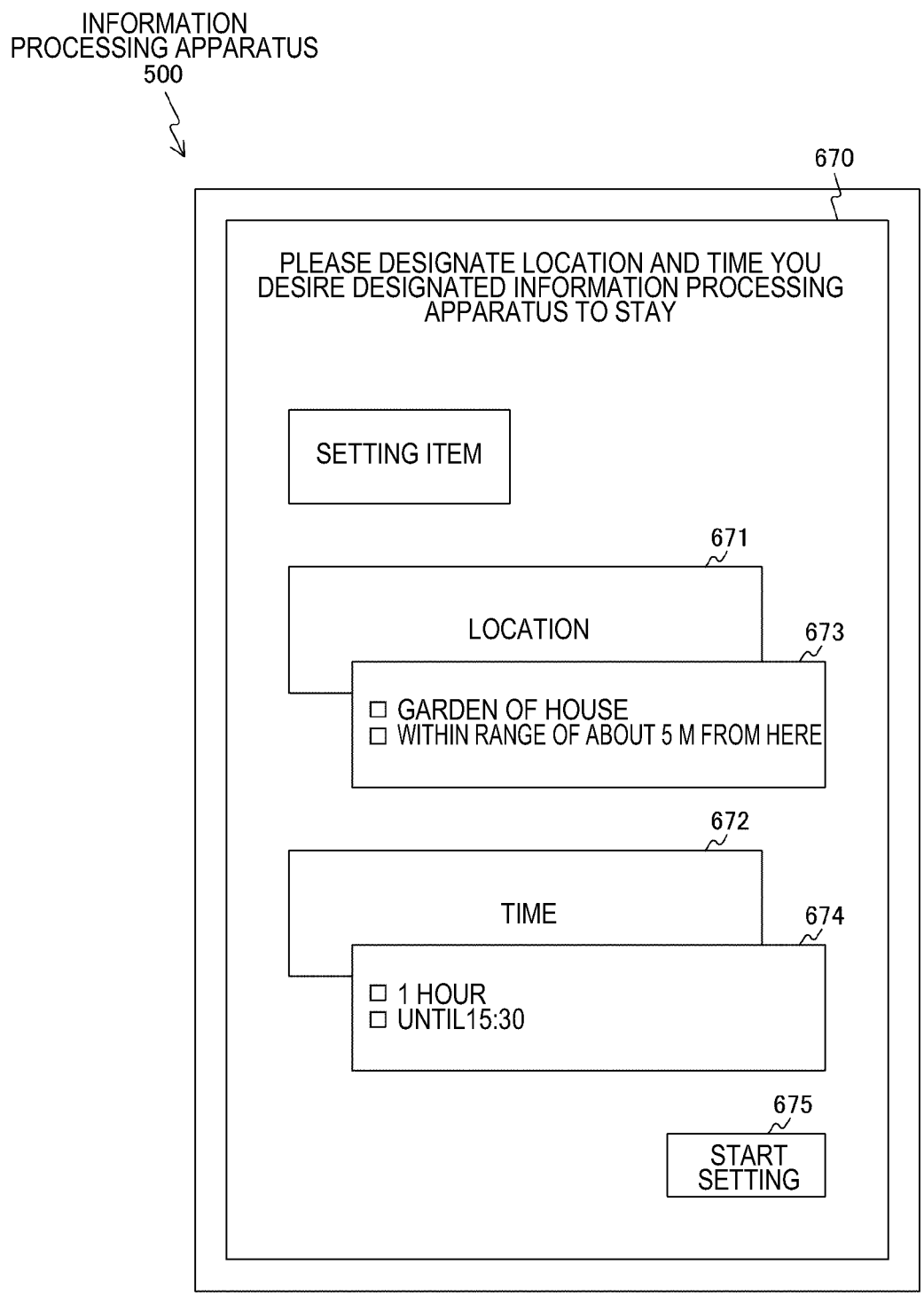
FIG. 19 is a diagram which shows a display screen example displayed between respective information processing apparatuses included in the communication system 30 according to the second embodiment of the present technology.

FIGS. 18 and 19 show transition examples of a display screen displayed on a display unit 670 of the information processing apparatus 500 before a management setting request is transmitted. These display screens are a display screen for setting management content.

For example, if a location button 671 shown in FIG. 18 is selected (pressed), a location-related menu screen 673 is displayed as shown in FIG. 19. In addition, for example, if a time button 672 shown in FIG. 18 is selected (pressed), a time-related menu screen 674 is displayed as shown in FIG. 19. Only simplified content is shown on each of these display screens for ease of description, but information on more detailed management content may also be displayed.

For example, using the menu screens 673 and 674, management content desired by the mother is selected. An example of a display screen after the selection is performed is shown in FIG. 20.

Figure 20:
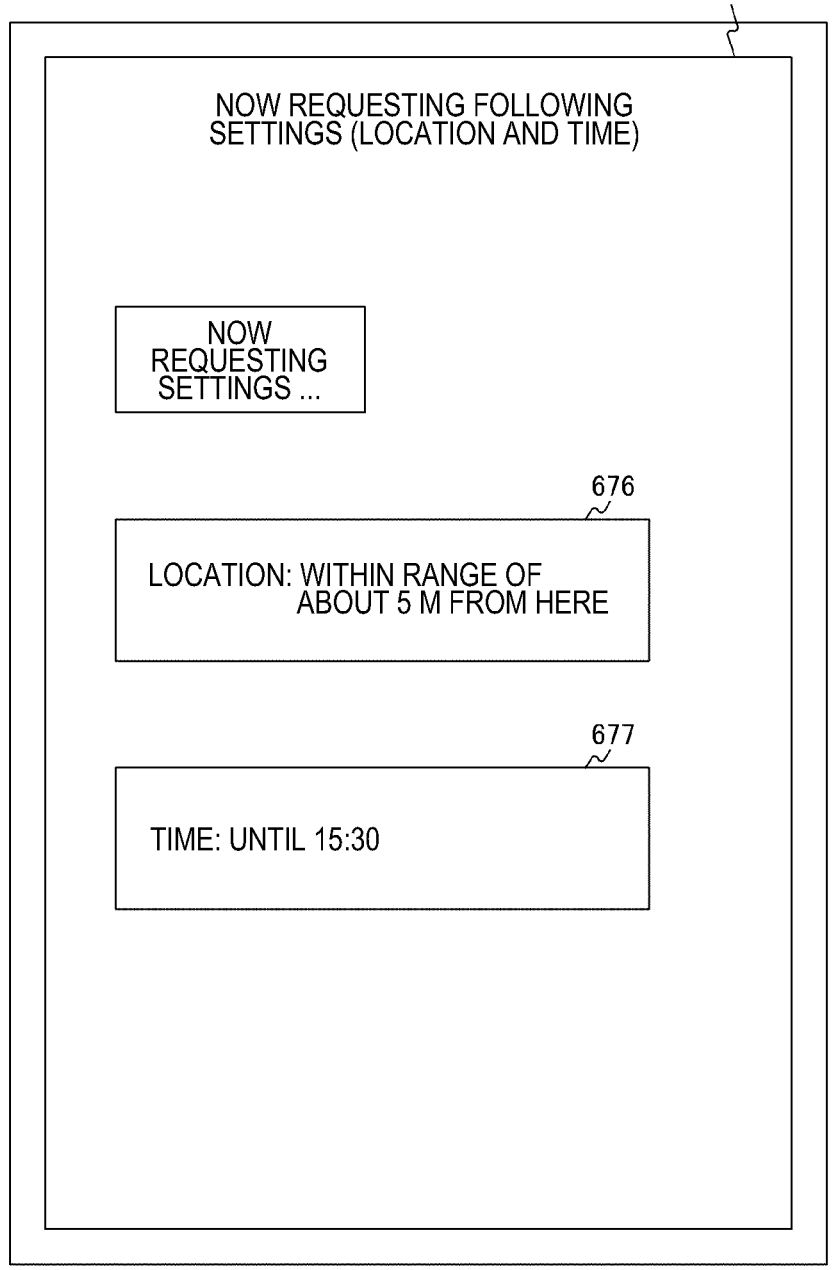
FIG. 20 is a diagram which shows a display screen example displayed between respective information processing apparatuses included in the communication system 30 according to the second embodiment of the present technology.

FIG. 20 shows an example of a display screen displayed on the display unit 670 of the information processing apparatus 500 when the management setting request is transmitted.

For example, when management content the mother desires is selected using the menu screens 673 and 674, the control unit of the information processing apparatus 500 transmits the management setting request to the information processing apparatus 510 (619). This management setting request is a request of the mother carrying the information processing apparatus 500 for requesting that the child carrying the information processing apparatus 510 stay in a designated location only for a designated time. Moreover, in the management setting request a management setting request frame shown in FIG. 17*a* is transmitted.

Here, location-related setting content (for example, content set using the menu screen 673) set by the mother carrying the information processing apparatus 500 is stored as a setting distance 541 shown in FIG. 17*a*. In addition, time-related setting content (for example, content set using the menu screen 674) set by the mother carrying the information processing apparatus 500 is stored as a setting distance 542 shown in FIG. 17*a*. Moreover, information (for example, an allowed application ID) for specifying an incentive set by the management setting request is stored in the incentive 543 shown in FIG. 17*a*.

In this manner, when the management setting request is transmitted (619), the control unit of the information processing apparatus 500 displays a display screen shown in FIG. 20 on the display unit 670. Screens 676 and 677, which display setting content corresponding to the transmitted management setting request, are displayed on the display screen.

Figure 21:
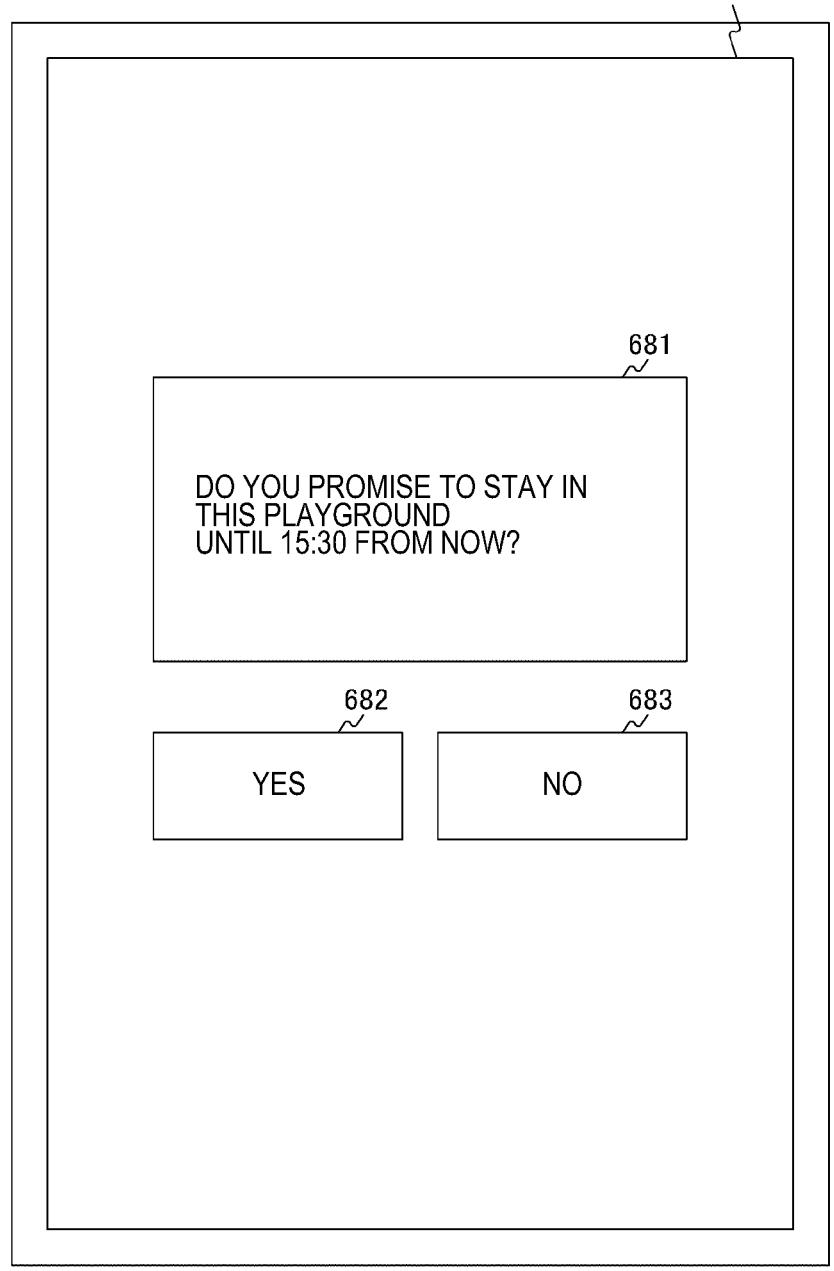
FIG. 21 is a diagram which shows a display screen example displayed between respective information processing apparatuses included in the communication system 30 according to the second embodiment of the present technology.

In addition, the control unit of the information processing apparatus 510 which receives the management setting request from the information processing apparatus 500 displays a display screen shown in FIG. 21 on a display unit 680 (619). A screen 681 which displays setting content corresponding to the received management setting request, a yes button 682, and a no button 683 are displayed on the display screen.

The yes button 682 and the no button 683 are buttons for causing a user (the child) to confirm the setting content corresponding to the received management setting request. That is, these are buttons for causing the child to confirm a promise with the mother.

For example, if the yes button 682 is selected (pressed), the control unit of the information processing apparatus 510 transmits a management setting confirmation to the information processing apparatus 500 (620). In this case, the control unit of the information processing apparatus 510 transmits the management setting confirmation after processing set in the information processing apparatus 510 is completed. In the management setting confirmation, the management setting confirmation frame shown in FIG. 17*b* is transmitted.

Here, content actually set in the information processing apparatus 510 and results thereof are stored as a setting distance 551, a setting time 552, and an incentive 553 shown in FIG. 17*b*. For example, when these are correctly set, each piece of information of the same name shown in FIG. 17*a* is stored in the setting distance 551, the setting time 552, and the incentive 553 shown in FIG. 17*b*. In addition, in a setting result 554 shown in FIG. 17*b*, information which indicates whether the information processing apparatus 510 sets the setting content corresponding to the management setting request from the information processing apparatus 500 is stored. For example, when the yes button 682 shown in FIG. 21 is selected (pressed), information which indicates completion of setting is stored in the setting result 554, and when the no button 683 is selected (pressed), information which indicates non-completion of setting is stored in the setting result 554.

Figure 22:
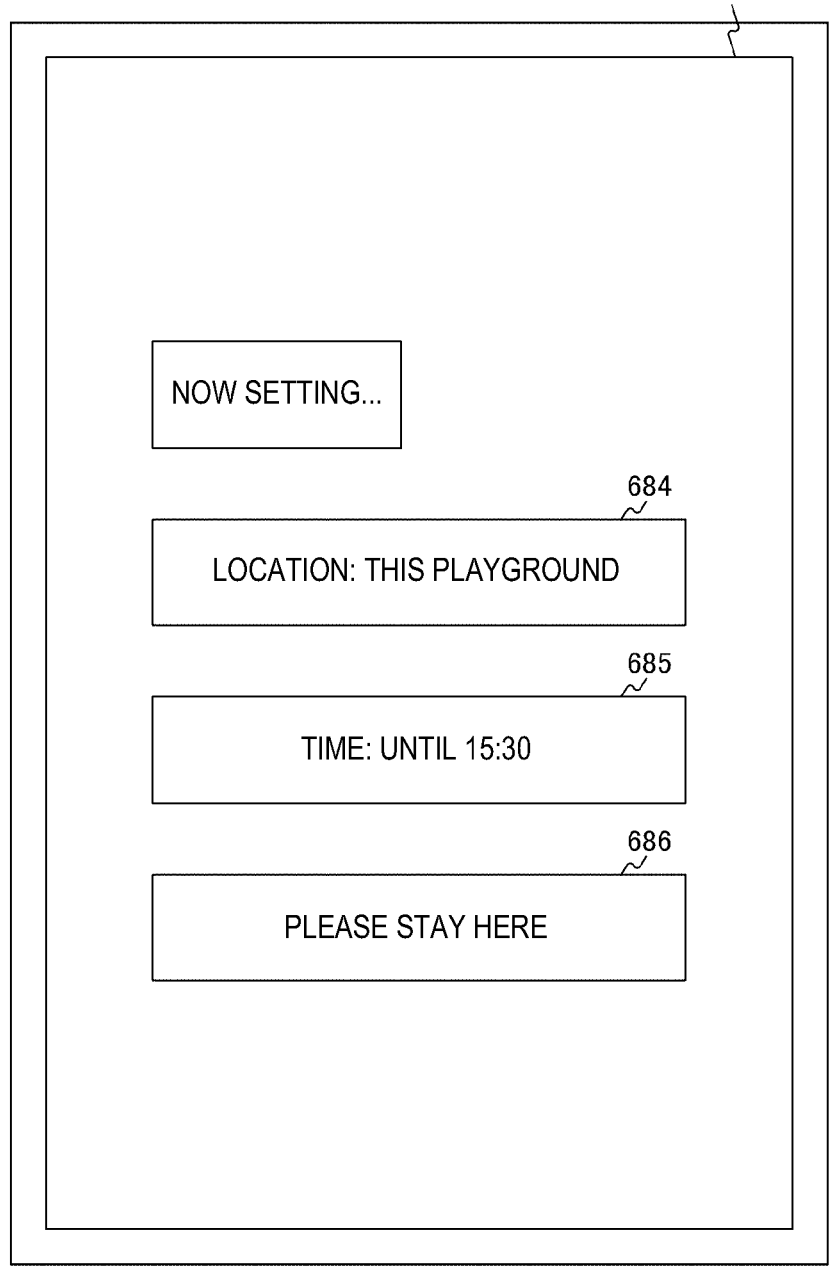
FIG. 22 is a diagram which shows a display screen example displayed between respective information processing apparatuses included in the communication system 30 according to the second embodiment of the present technology.

In addition, the control unit of the information processing apparatus 510 displays a display screen shown in FIG. 22 on the display unit 680 when the management setting confirmation is transmitted (620). Screens 684 to 686, which display re-confirmed setting content again, are displayed on the display screen. Accordingly, the child can easily re-confirm the management settings.

Figure 23:
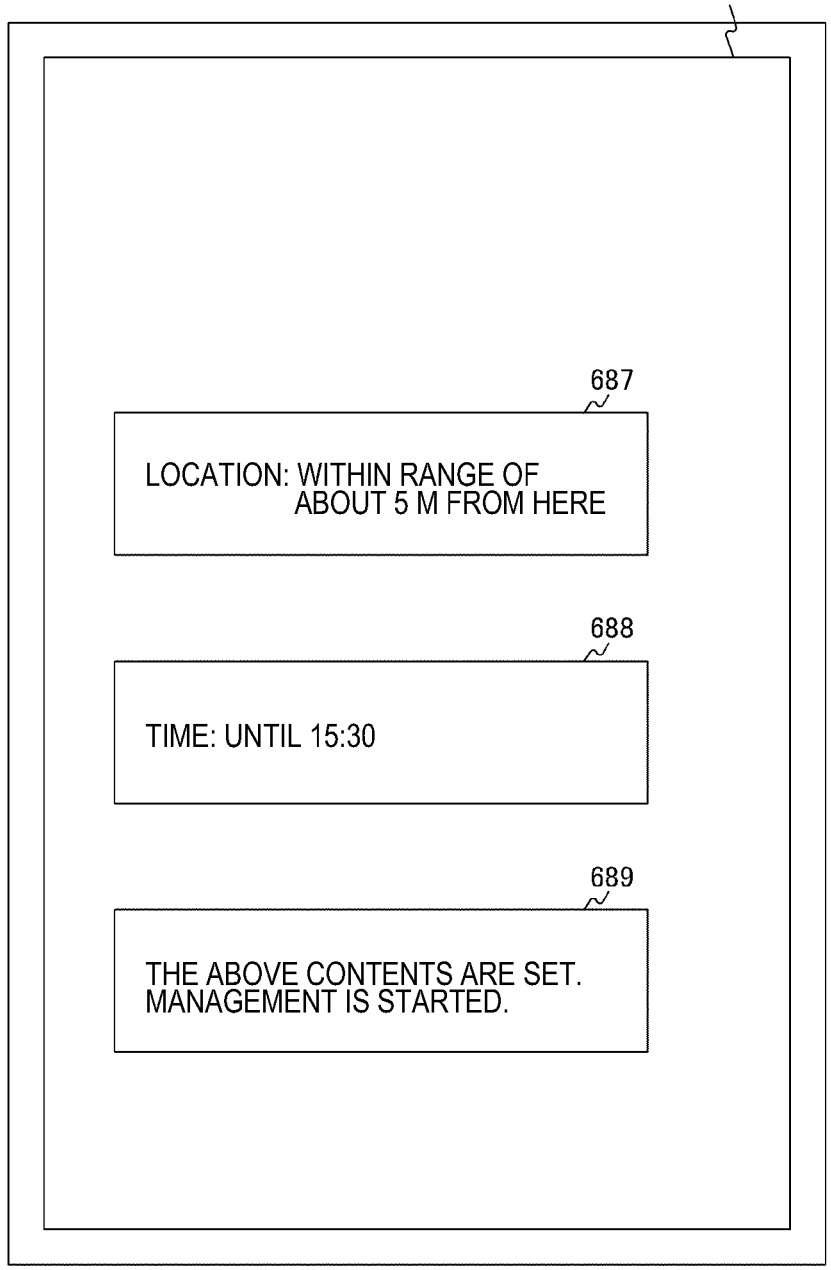
FIG. 23 is a diagram which shows a display screen example displayed between respective information processing apparatuses included in the communication system 30 according to the second embodiment of the present technology.

In addition, the control unit (620) of the information processing apparatus 500, which receives the management setting confirmation from the information processing apparatus 510, displays a display screen shown in FIG. 23 on the display unit 670. Screens 687 to 689, which display setting content corresponding to the transmitted management setting request, are displayed on the display screen. Accordingly, the mother can easily confirm that the management settings are successfully completed.

Moreover, when the management setting confirmation from the information processing apparatus 510 is received (620), the control unit of the information processing apparatus 500 transmits an incentive corresponding to the transmitted management setting request to the information processing apparatus 510 (621). As the incentive, for example, information including a use permission key of an application and the like is transmitted. In addition, after the incentive is transmitted to the information processing apparatus 510 (621), the control unit of the information processing apparatus 500 starts monitoring (622).

Figure 24:
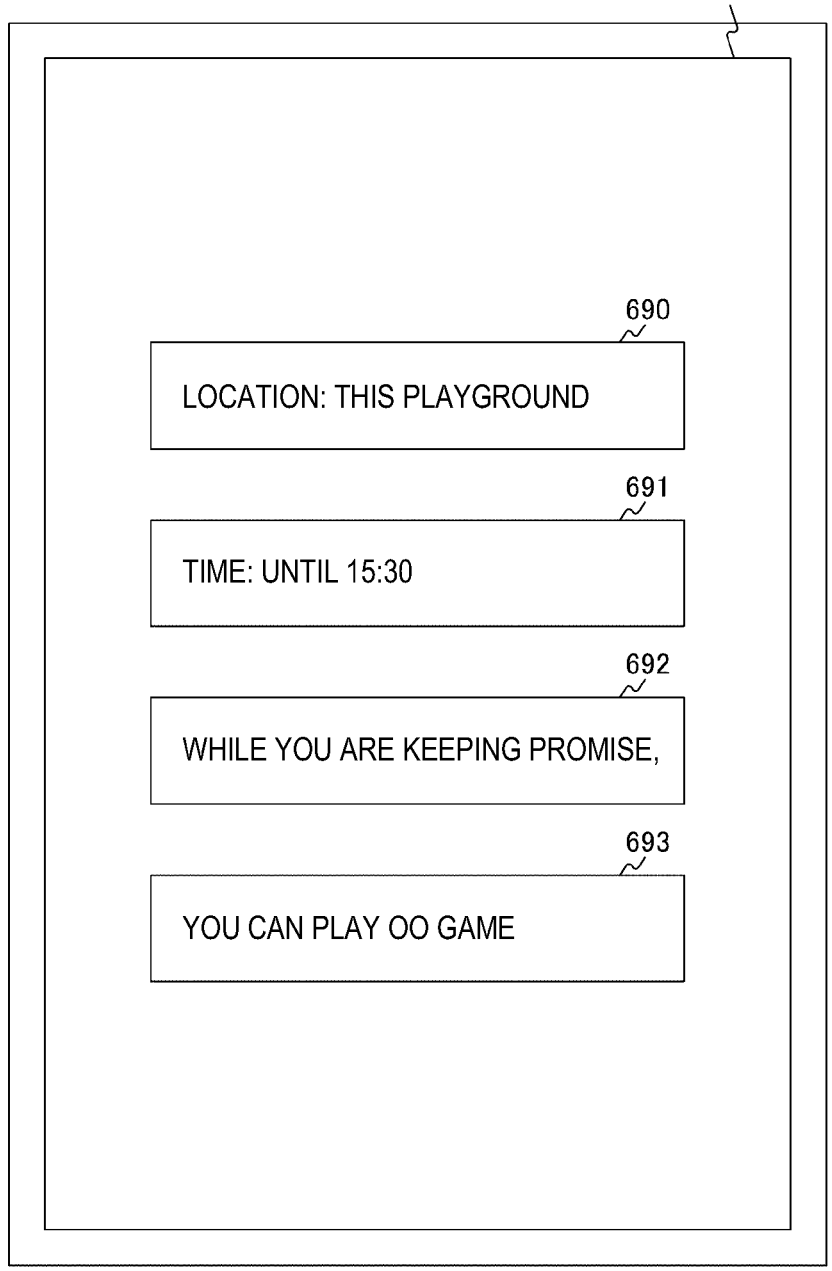
FIG. 24 is a diagram which shows a display screen example displayed between respective information processing apparatuses included in the communication system 30 according to the second embodiment of the present technology.

In addition, the control unit (621) of the information processing apparatus 510 which receives the incentive from the information processing apparatus 500 displays a display screen shown in FIG. 24 on the display unit 680. Screens 690 to 693, which display conditions (setting content) for validating the incentive, are displayed on the display screen.

In this manner, the child carrying the information processing apparatus 510 can use an allowed application while staying in a setting range designated by the mother.

Moreover, for example, other children (children instructed to stay in a playground) holding information processing apparatuses set in the same manner and information processing apparatuses carried by their parents are formed in Mesh-BSS. For this reason, even when mothers are away from a play place of children, network connection between the information processing apparatuses 500 and 510 is possible due to a hop. Moreover, when the mother moves to a wide location at which radio from other information processing apparatuses does not reach, it is possible to be connected via a network in a commercial facility. That is, the mother carrying the information processing apparatus 500 can be away from the location in which the child is and move to other locations in the commercial facility.

[Communication Example Related to Incentive Monitoring]

Figure 28:
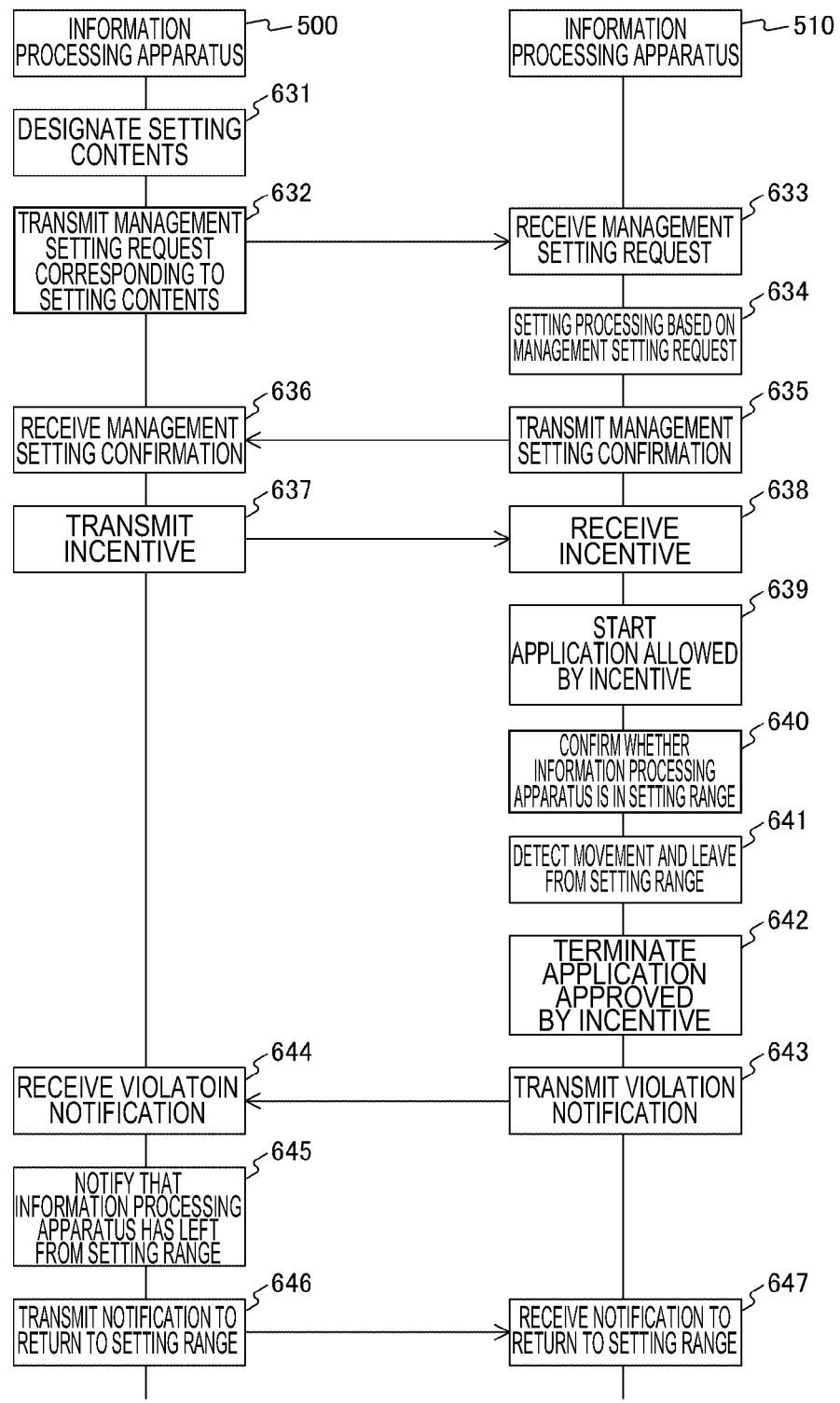
FIG. 28 is a sequence chart which shows a communication processing example among respective devices included in the communication system 10 according to the second embodiment of the present technology.

FIG. 28 is a sequence chart which shows a communication processing example among respective devices included in the communication system 10 according to the second embodiment of the present technology. FIG. 28 shows a communication processing example in which both of the information processing apparatuses 500 and 510 are assumed to move.

First, the information processing apparatus 500 designates setting content (631), and transmits a management setting request corresponding to the setting content to the information processing apparatus 510 (632 and 633). This process corresponds to the process (619) shown in FIG. 27.

Subsequently, the information processing apparatus 510 performs setting processing based on the received management setting request (634). In this case, information processing apparatus 510 starts to observe frames from other information processing apparatuses present in the setting range.

Then, the information processing apparatus 510 transmits a management setting confirmation (including a setting completion notification, a setting value report, and a reception notification) to the information processing apparatus 500 (635 and 636). Each process corresponds to the process (620) shown in FIG. 27.

Then, the information processing apparatus 500 transmits an incentive to the information processing apparatus 510 (637 and 638). Each process corresponds to the process (621) shown in FIG. 27.

Then, the information processing apparatus 510 starts an application (for example, a game) allowed by a received incentive (639). For example, it is possible to start the application (for example, the game) using a use permission key of the application.

Then, the information processing apparatus 510 determines whether the information processing apparatus 510 is in a setting range (640). A determination method for determining presence or absence in a setting range will be described in detail with reference to FIG. 29. Here, description is provided on an assumption that the information processing apparatus 510 leaves the setting range in FIG. 28.

For example, when the child carrying the information processing apparatus 510 moves and the information processing apparatus 510 is detected to leave the setting range (641), the information processing apparatus 510 terminates the application allowed by the received incentive (642). That is, the incentive transferred from the mother is invalidated. Alternatively, the child may be made to stop (or pause) the application in use. In this case, it is possible to display a violation warning and an indication that the application can be started again if the violation is resolved.

Subsequently, the information processing apparatus 510 transmits a violation notification to the information processing apparatus 500 (643 and 644). In this violation notification, a violation notification frame shown in FIG. 17c is transmitted. Here, the setting distance 561 and the setting time 562 shown in FIG. 17c correspond to each piece of information of the same name shown in FIG. 17a. In addition, information (for example, an application ID) for invalidating the set incentive is stored as incentive Disable info 563 shown in FIG. 17c.

Figure 25:
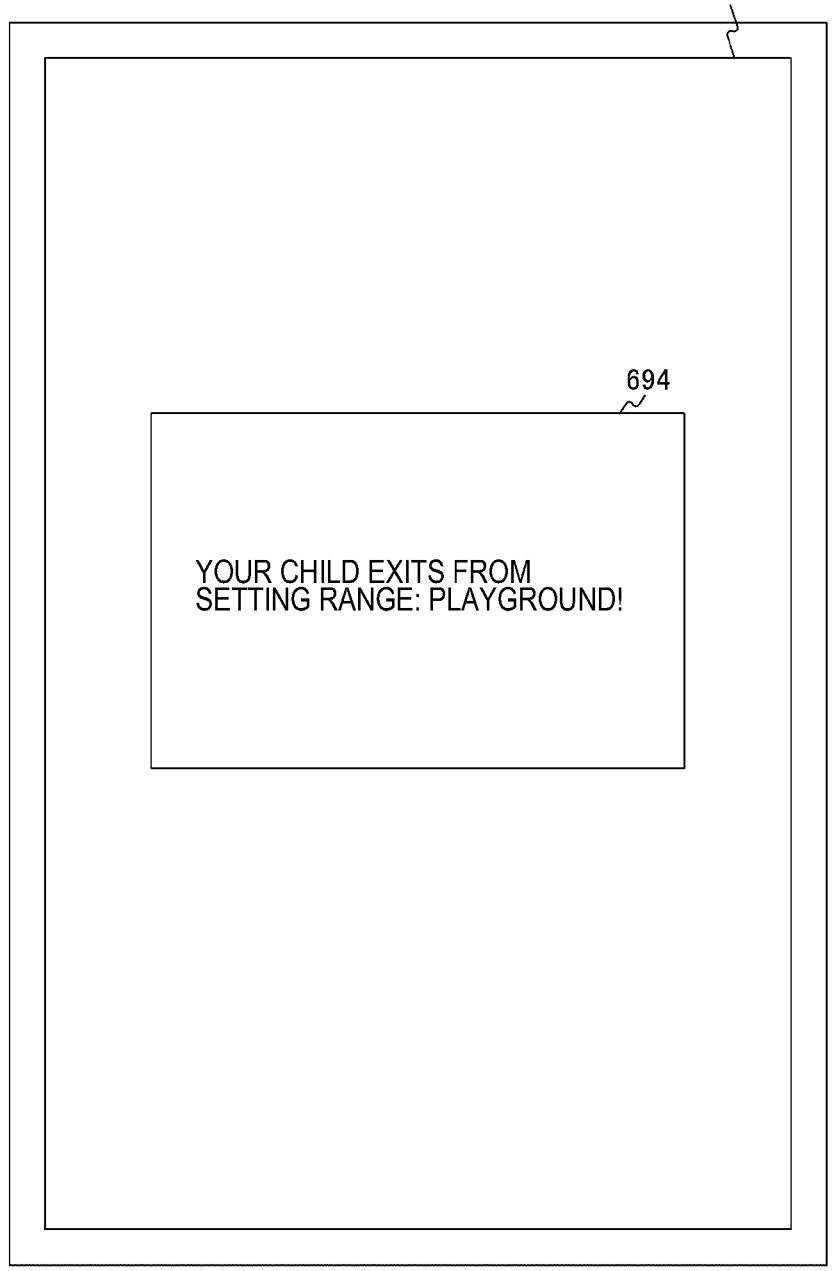
FIG. 25 is a diagram which shows a display screen example displayed between respective information processing apparatuses included in the communication system 30 according to the second embodiment of the present technology.

When the violation communication is received (644), the information processing apparatus 500 notifies a user that the information processing apparatus 510 has left from the setting range (645). This notification example is shown in FIG. 25. For example, the control unit of the information processing apparatus 500 displays a display screen shown in FIG. 25 on the display unit 670. A screen 694, which displays a warning indicating that there is a violation of the setting content, is displayed on the display screen.

Figure 26:
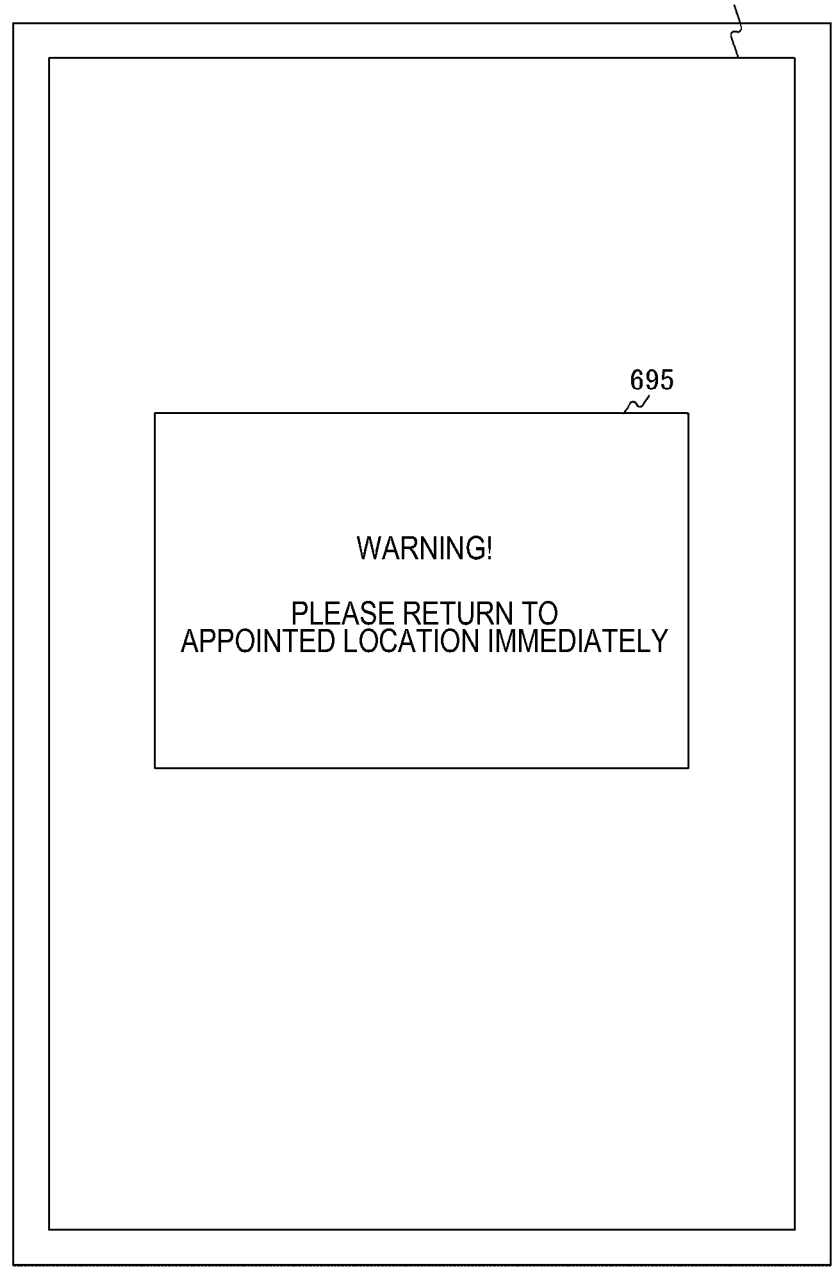
FIG. 26 is a diagram which shows a display screen example displayed between respective information processing apparatuses included in the communication system 30 according to the second embodiment of the present technology.

Subsequently, the information processing apparatus 500 transmits a notification to return to the setting range to the information processing apparatus 510 (646 and 647). When the communication is received (647), the information processing apparatus 510 notifies the user of a warning to return to the setting range. This warning example is shown in FIG. 26. For example, the control unit of the information processing apparatus 510 displays a display screen shown in FIG. 26 on the display unit 680. A screen 695, which displays a warning indicating that there was a violation of the setting content, is displayed on the display screen.

[Detection Example to Detect Movement Out of Setting Range]

Figure 29:
FIG. 29 is a diagram which schematically shows a peripheral device list 650 held by an information processing apparatus 510 according to the second embodiment of the present technology.

FIG. 29 is a diagram which schematically shows a peripheral device list 650 held by the information processing apparatus 510 according to the second embodiment of the present technology.

In the peripheral device list 650, measured values for respective information processing apparatuses present in the vicinity of the information processing apparatus 510 are stored. For example, terminal identification information 651 and a distance conversion value 652 are stored.

The terminal identification information 651 is identification information for identifying an information processing apparatus present in the vicinity of the information processing apparatus 510.

The distance conversion value 652 is a measured value which is calculated based on a frame received from an information processing apparatus present in the vicinity of the information processing apparatus 510.

For example, the control unit of the information processing apparatus 510 acquires RSSI at a time of receiving a frame from an information processing apparatus present in the vicinity of the information processing apparatus 510. Then, the control unit of the information processing apparatus 510 can calculate a distance to the information processing apparatus present in the vicinity of the information processing apparatus 510 based on the acquired RSSI. That is, it is possible to convert the acquired RSSI into the distance. Instead of RSSI, RTT and the like may be measured, and the distance may be obtained using a value of RTT.

Then, the control unit of the information processing apparatus 510 stores the obtained distance in the distance conversion value 652 of the peripheral device list 650, and identification information of the information processing apparatus having the obtained distance is stored in the terminal identification information 651 of the peripheral device list 650.

The control unit of the information processing apparatus 510 can determine whether the information processing apparatus 510 is present in the setting range or outside the setting range using the peripheral device list 650 generated in this manner.

Specifically, a set value of the setting range is set as a threshold value (for example, 5 m). Then, the control unit of the information processing apparatus 510 compares the distance conversion value 652 of the peripheral device list 650 with the threshold value, and determines whether there is a value equal to or greater than the threshold value in the distance conversion value 652 of the peripheral device list 650.

For example, when the distance conversion value 652 of information processing apparatuses having a predetermined ratio (for example, 30%) or more with the number of all of the information processing apparatuses stored in the peripheral device list 650 is equal to or greater than the threshold value, the information processing apparatus 510 can be determined to be present outside the setting range. In this example, an example in which a ratio (for example, 30%) with respect to the number of all of the information processing apparatuses in the vicinity of the information processing apparatus 510 is set as a reference to perform determination is shown. However, determination may be performed by setting the number of information processing apparatuses with a distance conversion value equal to or greater than the threshold value among the information processing apparatuses in the vicinity of the information processing apparatus 510 as a reference. Moreover, setting values (for example, a ratio and a number) which are these determination references can be set by a user operation.

However, it is considered that an information processing apparatuses present in the vicinity of the information processing apparatus 510 changes or moves as time elapses. Therefore, it is preferable that the peripheral device list 650 be updated regularly or irregularly.

[Operation Example of Information Processing Apparatus on Management Side]

Figure 30:
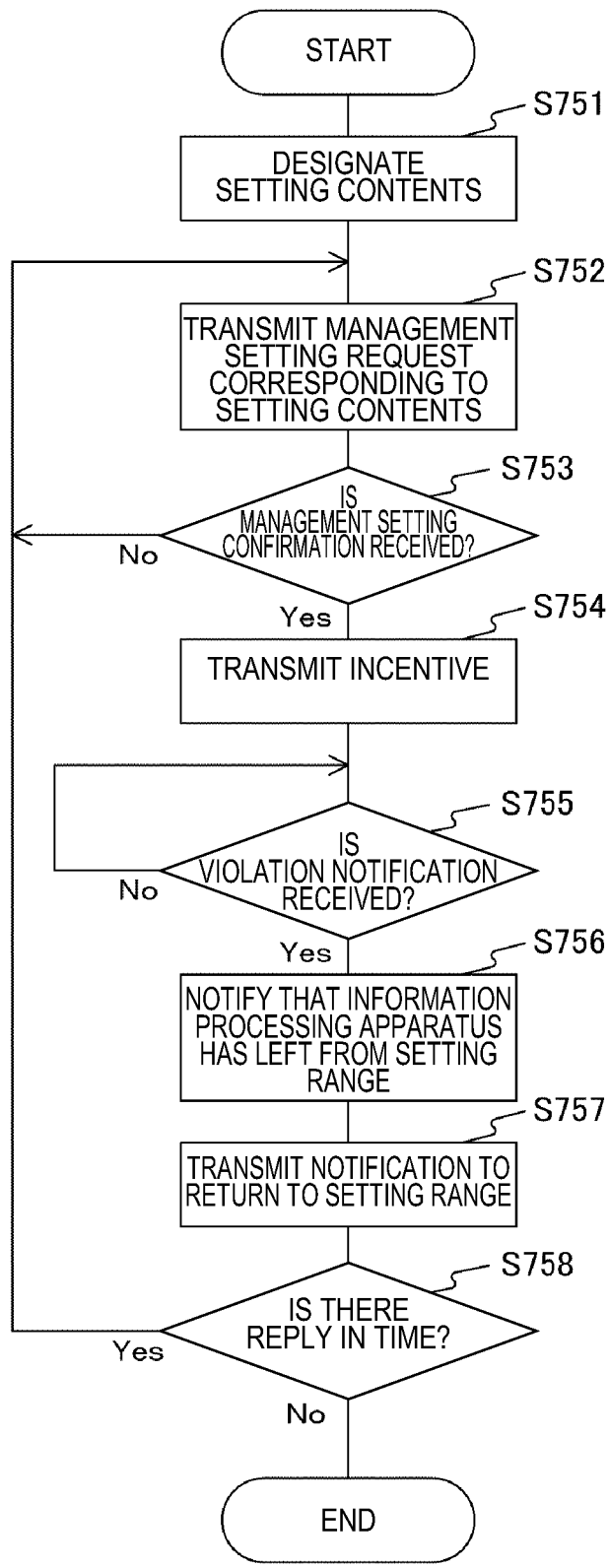
FIG. 30 is flowchart which shows an example of a processing procedure of management setting processing by the information processing apparatus 500 according to the second embodiment of the present technology.

FIG. 30 is flowchart which shows an example of a processing procedure of management setting processing by the information processing apparatus 500 according to the second embodiment of the present technology.

The control unit of the information processing apparatus 500 designates setting content (step S751) and transmits a management setting request corresponding to the setting content to the information processing apparatus 510 (step S752).

Subsequently, the control unit of the information processing apparatus 500 determines whether management setting confirmation has been received (step S753). Then, when the management setting confirmation has not been received (step S753), the procedure returns to step S752.

In addition, when the management setting confirmation has been received (step S753), the control unit of the information processing apparatus 500 transmits an incentive to the information processing apparatus 510 (step S754).

Then, the control unit of the information processing apparatus 500 determines whether a violation notification has been received (step S755). When the violation notification has not been received (step S755), monitoring is continuously performed.

When the violation notification has been received (step S755), the control unit of the information processing apparatus 500 notifies a user that the information processing apparatus 510 has left from a setting range (step S756).

Then, the control unit of the information processing apparatus 500 transmits a notification to return to the setting range to the information processing apparatus 510 (step S757). Subsequently, the control unit of the information processing apparatus 500 determines whether there is a reply (a reply to an indication to return to the setting range) in time (step S758). Then, when there is a reply (a reply to the notification to return to the setting range) in time (step S758), the procedure returns to step S752. On the other hand, when there is not a reply (a reply to an indication to return to the setting range) in time (step S758), operations of the management setting processing are ended.

[Operation Example of Information Processing Apparatus on Managed Side]

Figure 31:
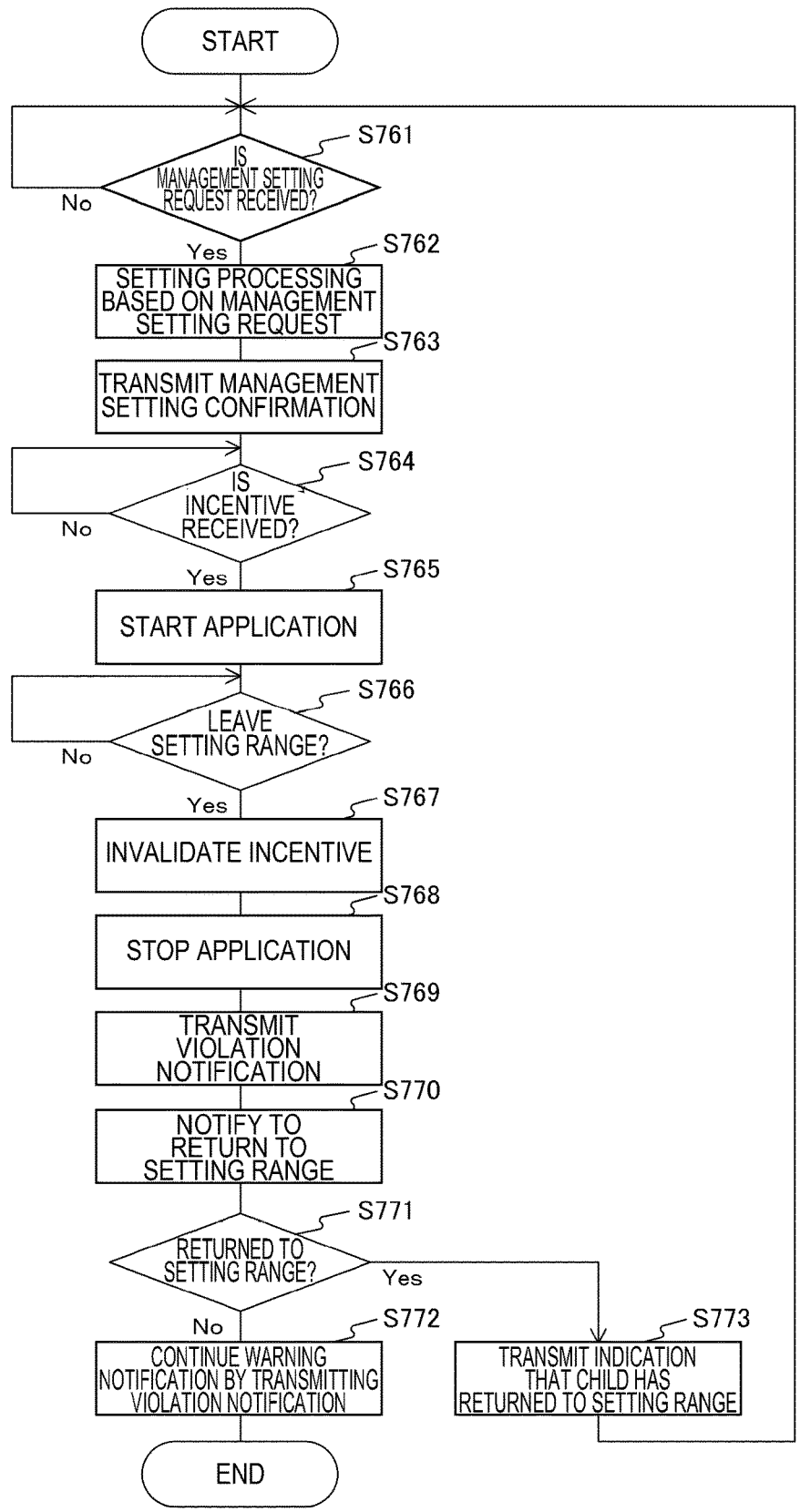
FIG. 31 is a flowchart which shows an example of a processing procedure of management processing by the information processing apparatus 510 according to the second embodiment of the present technology.

FIG. 31 is a flowchart which shows an example of a processing procedure of management processing by the information processing apparatus 510 according to the second embodiment of the present technology.

First, the control unit of the information processing apparatus 510 determines whether a management setting request has been received (step S761). When the management setting request has not been received (step S761), monitoring is continuously performed.

When the management setting request has been received (step S761), the control unit of the information processing apparatus 510 performs setting processing based on the received management setting request (step S762).

Subsequently, the control unit of the information processing apparatus 510 transmits a management setting confirmation to the information processing apparatus 500 (step S763).

Then, the control unit of the information processing apparatus 510 determines whether an incentive has been received (step S764). When the incentive has not been received (step S764), monitoring is continuously performed.

When the incentive has been received (step S764), the control unit of the information processing apparatus 510 starts an application (for example, a game) allowed by the received incentive (step S765).

Subsequently, the control unit of the information processing apparatus 510 determines whether the information processing apparatus 510 leaves a setting range (step S766). When the information processing apparatus 510 does not leave the setting range (step S766), monitoring is continuously performed.

When the information processing apparatus 510 leaves the setting range (step S766), the control unit of the information processing apparatus 510 invalidates the received incentive (step S767), and stops the application allowed by the incentive (step S768).

Then, the control unit of the information processing apparatus 510 transmits a violation notification to the information processing apparatus 500 (step S769).

Subsequently, the control unit of the information processing apparatus 510 performs a notification to return to the setting range (step S770). This notification may be performed on a condition in which a notification (the notification to return to the setting range) from the information processing apparatus 500 is received, and may be performed automatically before the notification is received.

Then, the control unit of the information processing apparatus 510 determines whether the information processing apparatus 510 returns within the setting range (step S771). When the information processing apparatus 510 does not return within the setting range (step S771), the control unit of the information processing apparatus 510 re-transmits a violation notification to the information processing apparatus 500 and continuously performs the warning notification (step S772). Then, when the information processing apparatus 510 does not return within the setting range even in a predetermined time, operations of the management processing are ended.

In addition, when the information processing apparatus 510 returns within the setting range (step S771), the control unit of the information processing apparatus 510 transmits an indication that the information processing apparatus 510 returns within the setting range to the information processing apparatus 500 (step S773).

In this manner, in the embodiments of the present technology, it is possible to cause the information processing apparatus to stay in a specific location by giving an incentive to the information processing apparatus that is desired to stay in the specific location. In this case, for example, it is possible to give the incentive depending on, for example, relative positions of a location in which one information processing apparatus is present and an information processing apparatus present in the vicinity of the one information processing apparatus. Accordingly, it is possible to induce the information processing apparatus in the vicinity to stay in its locations. That is, it is possible to induce another user to stay in the specific location.

In this manner, according to the embodiments of the present technology, it is possible to cause a user (for example, a user of a relay station, the child) carrying an information processing apparatus to stay in a desired location by the user's own intention (for example, an intention of the user of the relay station, an intention of the child) without being forced to do so by other users.

In the embodiments of the present technology, an example in which each information processing apparatus manages an incentive given from another information processing apparatus is shown, but an external device may collectively manage the incentives. For example, an information processing system (for example, cloud computing) on a network can manage the incentives.

3. Application Examples

The technology according to the present disclosure can be applied to various products. For example, the information processing apparatuses 100 to 104, 200 to 205, 300, 500 to 504, and 510 to 516 may be realized as mobile terminals such as smartphones, tablet personal computers (PCs), notebook PCs, portable game terminals, or digital cameras, fixed-type terminals such as television receivers, printers, digital scanners, or network storages, or car-mounted terminals such as car navigation apparatuses. Further, the information processing apparatuses 100 to 104, 200 to 205, 300, 500 to 504, and 510 to 516 may be realized as terminals (also referred to as machine type communication (MTC) terminals) which perform machine to machine (M2M) communication, such as smart meters, vending machine, remote monitoring apparatuses and point of sale (POS) terminals. Furthermore, the information processing apparatuses 100 to 104, 200 to 205, 300, 500 to 504, and 510 to 516 may be wireless communication modules mounted in such terminals (e.g., integrated circuit modules configured in one die).

3-1. First Application Example

Figure 32:
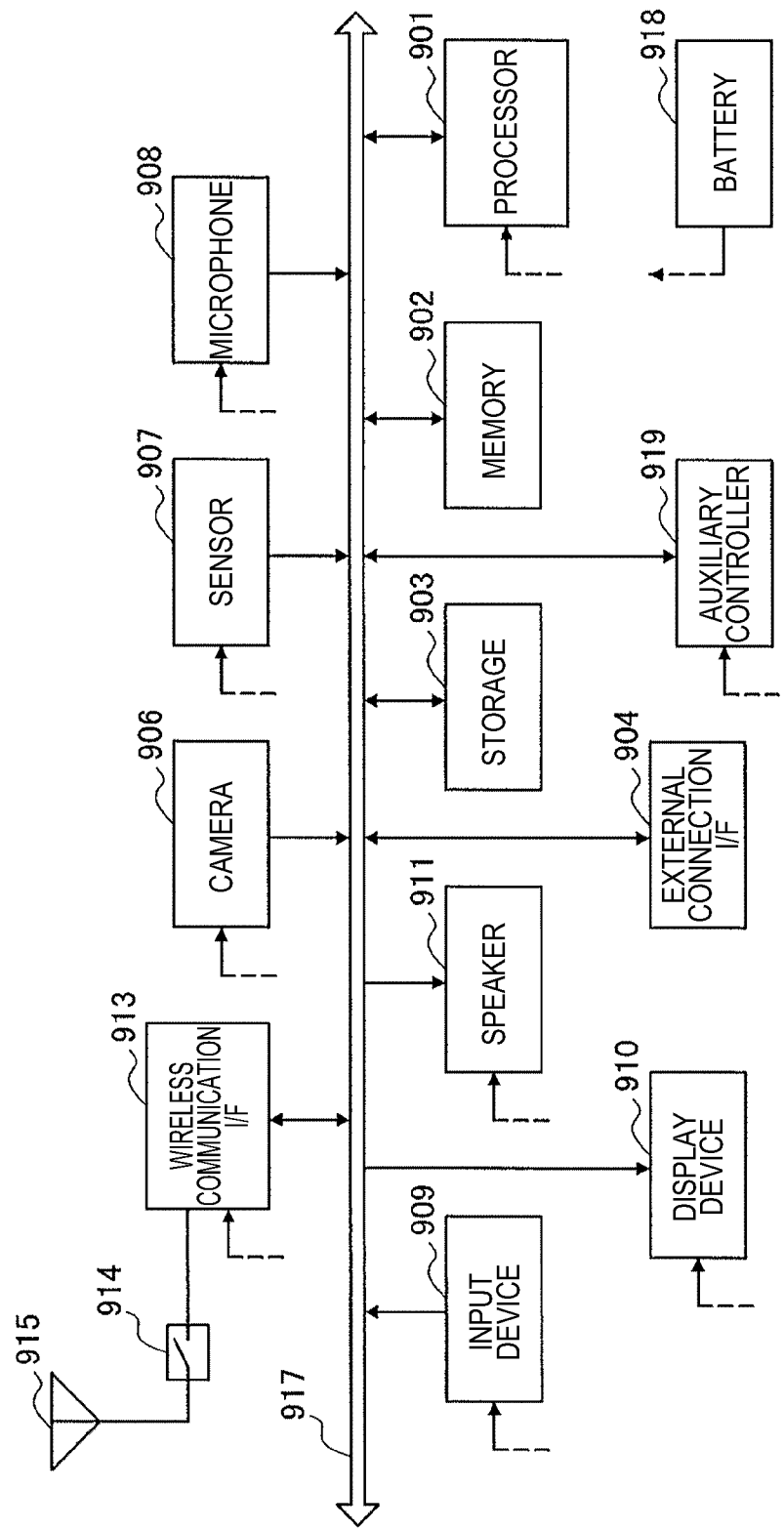
FIG. 32 is a block diagram which shows an example of a schematic configuration of a smart phone.

FIG. 32 is a block diagram showing an example of a schematic configuration of a smartphone 900 to which the technology of the present disclosure can be applied. The smartphone 900 includes a processor 901, a memory 902, a storage 903, an externally connected interface 904, a camera 906, a sensor 907, a microphone 908, a input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes a random access memory (RAM) and a read only memory (ROM), and stores programs executed by the processor 901 and data. The storage 903 can include a storage medium such as a semiconductor memory or a hard disk. The externally connected interface 904 is an interface for connecting an externally attached device such as a memory card or a universal serial bus (USB) device to the smartphone 900.

The camera 906 has an image sensor, for example, a charge coupled device (CCD) or a complementary metal oxide semiconductor (CMOS) to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like to receive manipulations or information inputs from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, and 11ad to execute the wireless LAN communication. The wireless communication interface 913 can communicate with another apparatus via a wireless LAN access point in an infrastructure mode. In addition, the wireless communication interface 913 can directly communicate with another apparatus in a direct communication mode such as an ad hoc mode, Wi-Fi Direct, or the like. Wi-Fi Direct is different from the ad hoc mode, and thus one of two terminals operates as an access point. However, communication is performed directly between the terminals. The wireless communication interface 913 can typically include a baseband processor, a radio frequency (RF) circuit, a power amplifier, and the like. The wireless communication interface 913 may be a single-chip module on which a memory that stores a communication control program, a processor that executes the program, and a relevant circuit are integrated. The wireless communication interface 913 may support another kind of wireless communication scheme such as a cellular communication scheme, a short-range wireless communication scheme, or a proximity wireless communication scheme in addition to the wireless LAN scheme. The antenna switch 914 switches a connection destination of the antenna 915 for a plurality of circuits (e.g., circuits for different wireless communication schemes) included in the wireless communication interface 913. The antenna 915 has a single or a plurality of antenna elements (e.g., a plurality of antenna elements constituting a MIMO antenna), and is used for transmission and reception of wireless signals from the wireless communication interface 913. Also, the wireless communication interface 913 may have a wireless communication interface function for connecting to a public line compliant with IEEE 802.16, a 3GPP specification (e.g., W-CDMA, GSM®, WiMAX, WiMAX2, LTE, LTE-A), or the like, and communicate with the public line.

Note that the smartphone 900 may include a plurality of antennas (e.g., antennas for a wireless LAN, antennas for a proximity wireless communication scheme, or antennas for public network, or the like), without being limited to the example of FIG. 32. In this case, the antenna switch 914 may be omitted from the configuration of the smartphone 900.

The bus 917 connects the processor 901, the memory 902, the storage 903, the externally connected interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 shown in FIG. 32 via power supply lines partially indicated by dashed lines in the drawing. The auxiliary controller 919 causes, for example, required minimum functions of the smartphone 900 to be operated in a sleep mode.

In the smartphone 900 shown in FIG. 32, the control unit 150 described with reference to FIG. 2 may be implemented in the wireless communication interface 913. Also, a portion of these functions may be implemented in the processor 901 or the auxiliary controller 919.

Note that the smartphone 900 may operate as a wireless access point (software AP) by the processor 901 executing the access point function at the application level. Also, the wireless communication interface 913 may have the wireless access point function.

3-2. Second Application Example

Figure 33:
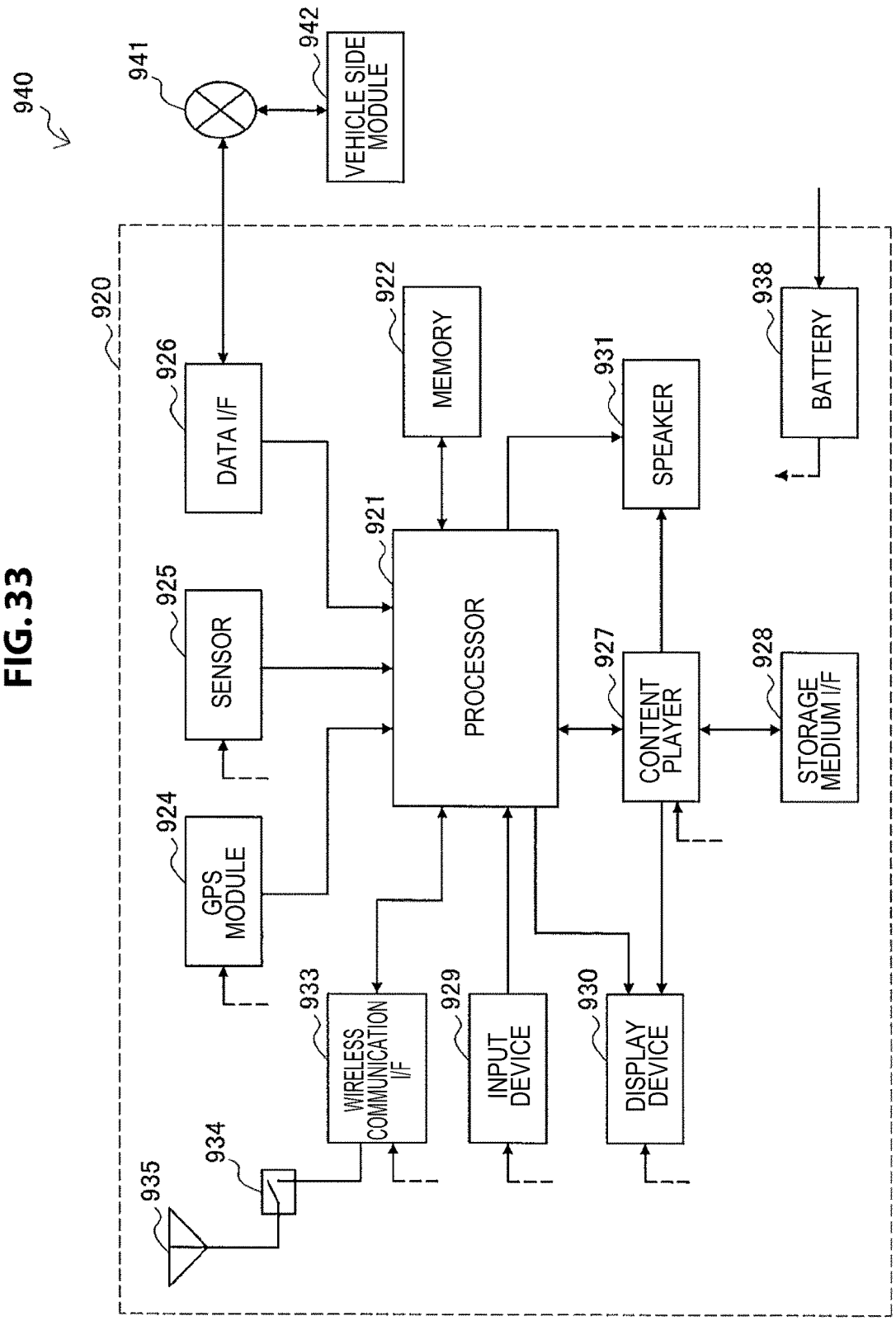
FIG. 33 is a block diagram which shows an example of a schematic configuration of a car navigation system.

FIG. 33 is a block diagram showing an example of a schematic configuration of a car navigation apparatus 920 to which the technology of the present disclosure can be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation apparatus 920. The memory 922 includes a RAM and a ROM storing programs executed by the processor 921 and data.

The GPS module 924 measures a position of the car navigation apparatus 920 (e.g., latitude, longitude, and altitude) using GPS signals received from a GPS satellite. The sensor 925 can include a sensor group including, for example, a gyro sensor, a geomagnetic sensor, a pneumatic sensor, and the like. The data interface 926 is connected to an in-vehicle network 941 via, for example, a terminal that is not illustrated to acquire data generated on the vehicle side such as car speed data.

The content player 927 reproduces content stored in a storage medium (e.g., a CD or a DVD) inserted into the storage medium interface 928. The input device 929 includes, for example, a touch sensor that detects touches on a screen of the display device 930, buttons, switches, and the like to receive manipulations or information inputs from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, and 11ad to execute wireless LAN communication. The wireless communication interface 933 can communicate with another apparatus via a wireless LAN access point in the infrastructure mode. In addition, the wireless communication interface 933 can directly communicate with another apparatus in a direct communication mode, such as an ad hoc mode, Wi-Fi Direct, or the like. The wireless communication interface 933 can typically have a baseband processor, an RF circuit, a power amplifier, and the like. The wireless communication interface 933 may be a single-chip module on which a memory that stores a communication control program, a processor that executes the program, and a relevant circuit are integrated. The wireless communication interface 933 may support another kind of wireless communication scheme such as a short-range wireless communication scheme, a proximity wireless communication scheme, or the cellular communication scheme in addition to the wireless LAN scheme. The antenna switch 934 switches a connection destination of the antenna 935 for a plurality of circuits included in the wireless communication interface 933. The antenna 935 has a single or a plurality of antenna elements and is used for transmission and reception of wireless signals from the wireless communication interface 933.

Note that the car navigation apparatus 920 may include a plurality of antennas, without being limited to the example of FIG. 33. In this case, the antenna switch 934 may be omitted from the configuration of the car navigation apparatus 920.

The battery 938 supplies electric power to each of the blocks of the car navigation apparatus 920 shown in FIG. 33 via power supply lines partially indicated by dashed lines in the drawing. In addition, the battery 938 accumulates electric power supplied from the vehicle.

In the car navigation apparatus 920 shown in FIG. 33, the control unit 150 described with reference to FIG. 2 may be implemented in the wireless communication interface 933. Also, a portion of these functions may be implemented in the processor 921.

The technology of the present disclosure may also be realized as an in-vehicle system (or a vehicle) 940 including one or more blocks of the car navigation device 920, the in-vehicle network 941, and a vehicle module 942. The vehicle module 942 generates vehicle data such as vehicle speed, engine speed, and trouble information, and outputs the generated data to the in-vehicle network 941.

The above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a series of sequences or may be handled as a program for causing a computer to execute the series of sequences and recording medium storing the program. As the recording medium, a CD (Compact Disc), an MD (MiniDisc), and a DVD (Digital Versatile Disk), a memory card, and a Blu-ray disc (registered trademark) can be used.

In addition, the effects described in the present specification are not limiting but are merely examples, and there may be additional effects.

Additionally, the present technology may also be configured as below.

(1)

An information processing apparatus including
a control unit configured to transmit a stay request to request a stay in a specific location to a first information processing apparatus included in a plurality of information processing apparatuses in a network in which the plurality of information processing apparatuses perform one-to-one wireless communication to be connected to each other, and configured to perform a control to give an incentive to the first information processing apparatus under a condition that the first information processing apparatus stays in the specific location.

(2)

The information processing apparatus according to (1), wherein, the first information processing apparatus is a relay device that relays data when the information processing apparatus receives the data transmitted from a second information processing apparatus included in the plurality of information processing apparatuses, and
the control unit gives the incentive to the first information processing apparatus under a condition that the first information processing apparatus stays in the specific location until reception of the data is completed.

(3)

The information processing apparatus according to (2), wherein the control unit decides the incentive based on a relative positional relationship among the information processing apparatus, the first information processing apparatus, and the second information processing apparatus.

(4)

The information processing apparatus according to (2), wherein the control unit decides the incentive based on the number of information processing apparatuses capable of being involved in the reception of the data among respective information processing apparatuses included in the plurality of information processing apparatuses.

(5)

The information processing apparatus according to (1) or (2), wherein the control unit decides the incentive based on a time for which the first information processing apparatus stays in the specific location.

(6)

The information processing apparatus according to any of (1) to (5), wherein the control unit starts a specific application in the first information processing apparatus by giving the incentive to the first information processing apparatus.

(7)

The information processing apparatus according to any of (1) to (6), wherein, when the first information processing apparatus is detected to leave a range of the specific location, the control unit invalidates the incentive.

(8)

The information processing apparatus according to any of (1) to (7), wherein, when the first information processing apparatus is detected to leave a range of the specific location, the control unit transmits a warning notification for recommending the first information processing apparatus to return to the specific location to the first information processing apparatus.

(9)

An information processing apparatus including a control unit configured to perform a control to perform processing based on an incentive given from a first information processing apparatus under a condition that the information processing apparatus stays in the specific location, when a stay request that requests staying in a specific location is received from the first information processing apparatus included in a plurality of information processing apparatuses in a network in which the plurality of information processing apparatuses perform one-to-one wireless communication to be connected to each other.

(10)

The information processing apparatus according to (9), wherein the control unit starts a specific application based on the incentive.

(11)

The information processing apparatus according to (10), wherein, when the information processing apparatus is detected to leave a range of the specific location, the control unit stops or terminates the specific application.

(12)

The information processing apparatus according to any of (9) to (11), wherein, when the information processing apparatus is detected to leave the range of the specific location, the control unit invalidates the incentive.

(13)

The information processing apparatus according to any of (9) to (12), wherein, when the information processing apparatus is detected to leave the range of the specific location, the control unit transmits a notification of the detection to the first information processing apparatus.

(14)

An information processing method including:
transmitting a stay request to request a stay in a specific location to a first information processing apparatus included in a plurality of information processing apparatuses in a network in which the plurality of information processing apparatuses perform one-to-one wireless communication to be connected to each other, and
giving an incentive to the first information processing apparatus under a condition that the first information processing apparatus stays in the specific location.

REFERENCE SIGNS LIST 10, 20, 30 communication system
100 to 104, 200 to 205, 300, 431 to 433, 500 to 504, 510 to 516 information processing apparatus
110 wireless communication unit
120 antenna
130 I/O interface
140 storage unit
150 control unit
160 operation reception unit
170, 670, 680 display unit
181 state detection unit
182 audio output unit
190 bus
900 smart phone
901 processor
902 memory
903 storage
904 external connection interface
906 camera
907 sensor
908 microphone
909 input device
910 display device
911 speaker
913 wireless communication interface
914 antenna switch
915 antenna
917 bus
918 battery
919 auxiliary controller
920 car navigation system
921 processor
922 memory
924 GPS module
925 sensor
926 data interface
927 content player
928 storage medium interface
929 input device
930 display device
931 speaker
933 wireless communication interface
934 antenna switch
935 antenna
941 in-vehicle network
942 vehicle module

The invention claimed is:
1. A first information processing apparatus, comprising:
circuitry configured to:
transmit to a communication relay apparatus of a first plurality of communication relay apparatuses, stay request information that includes a request to the communication relay apparatus to stay in a specific location for a time period,
wherein the time period is based on completion of data reception from a second information processing apparatus via the communication relay apparatus;
receive a stay approval notification from the communication relay apparatus, based on the stay request information;
determine incentive information based on a relative positional relationship between the first information processing apparatus, the communication relay apparatus, and the second information processing apparatus; and
transmit, based on the stay approval notification, the incentive information to the communication relay apparatus.

2. The first information processing apparatus according to claim 1, wherein the communication relay apparatus is a relay device that relays data transmitted from the second information processing apparatus to the first information processing apparatus.

3. The first information processing apparatus according to claim 2, wherein the circuitry is further configured to determine the incentive information, based on a count of a second plurality of communication relay apparatuses of the first plurality of communication relay apparatuses that are available for the data reception from the second information processing apparatus.

4. The first information processing apparatus according to claim 1, wherein the circuitry is further configured to determine the incentive information, based on the time period.

5. The first information processing apparatus according to claim 1, wherein the circuitry is further configured to control execution of an application in the communication relay apparatus based on the incentive information.

6. The first information processing apparatus according to claim 1, wherein the circuitry is further configured to:
detect the communication relay apparatus that moves out of a threshold distance range from the specific location; and
invalidate the incentive information based on the detection.

7. The first information processing apparatus according to claim 1, wherein the circuitry is further configured to:
detect the communication relay apparatus that moves out of a threshold distance range from the specific location; and
transmit a warning notification to inform the communication relay apparatus to return to within the threshold distance range from the specific location.

8. A communication relay apparatus, comprising:
circuitry configured to:
communicate with each of a first information processing apparatus and a second information processing apparatus;
receive from the first information processing apparatus, stay request information that includes a request to the communication relay apparatus to stay in a specific location for a time period,
wherein the time period is based on completion of data reception by the first information processing apparatus from the second information processing apparatus via the communication relay apparatus;
transmit a stay approval notification to the first information processing apparatus based on the stay request information; and
receive incentive information from the first information processing apparatus,
wherein the incentive information is based on a relative positional relationship between the communication relay apparatus, the first information processing apparatus, and the second information processing apparatus.

9. The communication relay apparatus according to claim 8, wherein the circuitry is further configured to execute an application, based on the incentive information.

10. The communication relay apparatus according to claim 9, wherein the circuitry is further configured to:
detect whether a first distance between the communication relay apparatus and the specific location is greater than a threshold distance; and
terminate the application, based on the detection.

11. The communication relay apparatus according to claim 8, wherein the circuitry is further configured to:
detect whether a first distance between the communication relay apparatus and the specific location is greater than a threshold distance; and
invalidate the incentive information, based on the detection.

12. The communication relay apparatus according to claim 8, wherein the circuitry is further configured to:
detect whether a first distance between the communication relay apparatus and the specific location is greater than a threshold distance; and
transmit a notification message to the first information processing apparatus, based on the detection.

13. An information processing method, comprising:
in a first information processing apparatus;
transmitting to a communication relay apparatus, stay request information that includes a request to the communication relay apparatus to stay in a specific location for a time period,
wherein the time period is based on completion of data reception from a second information processing apparatus via the communication relay apparatus;
receiving a stay approval notification from the communication relay apparatus, based on the stay request information;
determining incentive information based on a relative positional relationship between the first information processing apparatus, the communication relay apparatus, and the second information processing apparatus; and
transmitting, based on the stay approval notification, the incentive information to the communication relay apparatus.

14. The first information processing apparatus according to claim 1, wherein each of the first plurality of communication relay apparatuses communicate based on peer-to-peer wireless communication.

15. A first information processing apparatus, comprising:
circuitry configured to:
transmit to a communication relay apparatus of a first plurality of communication relay apparatuses, stay request information that includes a request to the communication relay apparatus to stay in a specific location for a time period,
wherein the time period is based on completion of data reception from a second information processing apparatus via the communication relay apparatus;
receive a stay approval notification from the communication relay apparatus, based on the stay request information;
transmit, based on the stay approval notification, incentive information to the communication relay apparatus;
detect the communication relay apparatus that moves out of a threshold distance range from the specific location; and
invalidate the incentive information based on the detection.

16. A communication relay apparatus, comprising:
circuitry configured to:
communicate with each of a first information processing apparatus and a second information processing apparatus;
receive from the first information processing apparatus, stay request information that includes a request to the communication relay apparatus to stay in a specific location for a time period,
wherein the time period is based on completion of data reception by the first information processing apparatus from the second information processing apparatus via the communication relay apparatus;
transmit a stay approval notification to the first information processing apparatus based on the stay request information;
receive incentive information from the first information processing apparatus;

detect whether a first distance between the communication relay apparatus and the specific location is greater than a threshold distance; and invalidate the incentive information, based on the detection.

\* \* \* \* \*